(12) United States Patent
Abe et al.

(10) Patent No.: US 7,551,840 B2
(45) Date of Patent: Jun. 23, 2009

(54) VIDEO TAPE RECORDER AND RECORDING METHOD

(75) Inventors: Fumiyoshi Abe, Kanagawa (JP); Takuji Himeno, Chiba (JP); Toshinori Kouzai, Kanagawa (JP); Yonetaro Totsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 10/517,073

(22) PCT Filed: May 16, 2003

(86) PCT No.: PCT/JP03/06104

§ 371 (c)(1),
(2), (4) Date: Jun. 2, 2005

(87) PCT Pub. No.: WO03/105473

PCT Pub. Date: Dec. 18, 2003

(65) Prior Publication Data

US 2005/0238331 A1    Oct. 27, 2005

(30) Foreign Application Priority Data

Jun. 7, 2002    (JP) .............................. 2002-166496

(51) Int. Cl.
H04N 7/26    (2006.01)

(52) U.S. Cl. ........................... 386/112; 386/95; 386/81; 386/84; 386/109; 386/124

(58) Field of Classification Search ......... 386/111–112, 386/95, 124, 81, 84, 109
See application file for complete search history.

(56) References Cited

U.S. PATENT DOCUMENTS

| 5,857,058 | A | * | 1/1999 | Iwamoto et al. | ............. 386/109 |
| 5,878,187 | A | * | 3/1999 | Kubota et al. | ................. 386/95 |
| 5,940,574 | A | * | 8/1999 | Iwamoto et al. | ............... 386/87 |
| 6,154,866 | A | * | 11/2000 | Kawahara et al. | ........... 714/755 |
| 6,222,986 | B1 | * | 4/2001 | Inuiya | ........................ 386/117 |
| 7,398,007 | B2 | * | 7/2008 | Isozaki | ........................ 386/84 |
| 7,450,816 | B2 | * | 11/2008 | Sugimura et al. | ............. 386/68 |

FOREIGN PATENT DOCUMENTS

| JP | 9-70016 | 3/1997 |
| JP | 2000 244863 | 9/2000 |
| JP | 2001-275077 | 10/2001 |
| JP | 2001-291335 | 10/2001 |
| JP | 2002 56624 | 2/2002 |

* cited by examiner

*Primary Examiner*—Thai Tran
*Assistant Examiner*—Helen Shibru
(74) *Attorney, Agent, or Firm*—Frommer Lawrence & Haug LLP; William S. Frommer; Thomas F. Presson

(57) ABSTRACT

A video tape recorder for recording high definition television video signals onto a magnetic tape, and recording at least reproduction standard management information in the order of pictures of video data in a main sector, and in the order of pictures of compressed video data in a subcode sector. Search data is recorded on the basis of time management information of video data at the time of decoding, while display data is recorded on the basis of time management information on reproduction and output of video data.

6 Claims, 30 Drawing Sheets

| RUN PATTERN | CODEWORD<br>MSB                                                               LSB |
|---|---|
| PATTERN A | 000111000111000011100011 |
| PATTERN B | 111000111000111100011100 |

FIG. 5

|  | MSB | | LSB |
|---|---|---|---|
| SYNC PATTERN M0 | 0101111111110000 | | |
| SYNC PATTERN M1 | 1010000000001111 | | |

FIG. 6

| ID0 | | ID1 | ID2 |
|---|---|---|---|
| b7-5 | b4-0 | MSB | MSB |
| FORMAT-TYPE | TRACK PAIR NUMBER (0–31) | SYNC BLOCK NO. | OVERWRITE PROTECT |

FIG. 7

| b7 | b6 | b5 | b4 | b3 | b2 | b1 | b0 |
|---|---|---|---|---|---|---|---|
| ← DATA TYPE → | | | RESERVED | | | | |
| 0 NULL | | | | | | | |
| 1 AUX | | | | AUX MODE | | DF/FRC | SBSC |
| 2 PES-VIDEO | | | FULL/PARTIAL | | CONTINUITY COUNTER | | |
| 3 PES-AUDIO | | | FULL/PARTIAL | | CONTINUITY COUNTER | | |
| 4 TS-1H | | | JUMP FLAG | | TIME STAMP | | |
| 5 TS-2H | | | | | CONTINUITY COUNTER | | |
| 6 SEARCH | | | RESERVED | | SEARCH SPEED | | SBSC |
| 7 RESERVED | | | RESERVED | | | | |

| AUX MODE | b4-2 | b1 |
|---|---|---|
| 0 | AUX-V | FRC |
| 1 | AUX-A | RESERVED |
| 2 | PES-PSI 1 | RESERVED |
| 3 | PES-PSI 2 | RESERVED |
| 4 | AUX-SYSTEM (ECCTB) | DF |
| 5 | AUX-M | FRC |
| 6,7 | RESERVED | RESERVED |

| SEARCH SPEED | |
|---|---|
| 0 | RESERVED |
| 1 | RESERVED |
| 2 | SEARCH x8 |
| 3 | RESERVED |
| 4 | SEARCH x24 |
| 5-7 | RESERVED |

FIG. 8

MAIN (BEFORE 24-25 MODULATION)

| | | | | (Kbps) | | (No. of SBs) | (%) |
|---|---|---|---|---|---|---|---|
| SYNC | ID | SB-HEADER | AUX | 501 | | 2.2 | 1.6% |
| | | | V-DATA | 25,021 | C1 9.0% | 109.9 | 77.9% |
| | | | A-DATA | 421 | | 1.85 | 1.3% |
| | | | S-DATA | 2,073 | | 9.1 | 6.5% |
| | | | C2 | | | 18 | 12.8% |
| 2 BYTES | 3 BYTES | 1 BYTE | 95 BYTES | | 10 BYTES | 141 | 100.0% |

FIG. 10

| FIXED-LENGTH (DATA 4 BYTES) PACKET STRUCTURE | | | | | |
|---|---|---|---|---|---|
| BITS | 7 | 6 | 5 | .... | 0 |
| KEYWORD | 0 | 0 | \multicolumn{3}{c}{KEYWORD NUMBER} | | |
| DATA | \multicolumn{5}{c}{DATA 4 BYTES} | | | | |

FIG. 11

| VARIABLE-LENGTH PACKET STRUCTURE | | | | | |
|---|---|---|---|---|---|
| BITS | 7 | 6 | 5 | .... | 0 |
| KEYWORD | 0 | 1 | KEYWORD NUMBER | | |
| LENGTH | NUMBER OF BYTES n | | | | |
| DATA | DATA n BYTES | | | | |

FIG. 12

4-BYTE FIXED LENGTH

| KEY-WORD | AUX CATEGORY | DESCRIPTION | REMARKS |
|---|---|---|---|
| 0 | SUB | TTC | FOR SUBCODE 5-BYTE 1 PACKET |
| 1 | SUB | BINARY GROUP | |
| 2 | SUB | PART NO. | |
| 3 | SUB | CHAPTER START | |
| 4 | SUB | ATNF (ATN+FLG) | |
| 5 | SUB | REC DATE | |
| 6 | SUB | REC TIME | |
| 7 | SUB | ETN | |
| 8 | RES. | RESERVED | |
| : | RES. | RESERVED | |
| 62 | RES. | RESERVED | |
| 63 | RES. | NO-INFORMATION PACK | USED IF THERE IS NO VALID DATA |

FIG. 13

VARIABLE-DATA-LENGTH PACKET

| KEY-WORD | AUX CATEGORY | DESCRIPTION | REMARKS |
|---|---|---|---|
| 64 | AUX-A | AUD-FRAM | PES-AUD & EDIT INFO. |
| 65 | AUX-A | RESERVED | |
| 66 | AUX-A | RESERVED | |
| 67 | AUX-A | RESERVED | |
| 68 | AUX-V | VID-FRAM | PES-VIDEO & EDIT INFO. |
| 69 | AUX-V | RESERVED | |
| 70 | AUX-V | RESERVED | |
| 71 | AUX-V | RESERVED | |
| 72 | AUX-V | UMID | 64-BYTE DATA |
| 73 | AUX-V | DV PACKET | MAX 18 DV COMPATIBLE 5-BYTE PACKETS |
| 74 | AUX-V | RESERVED | |
| 75 | AUX-V | RESERVED | |
| 76 | AUX-V | RESERVED | |
| 77 | AUX-V | ASCII CHAR MESSAGE | |
| 78 | AUX-V | SHIFT JIS MESSAGE | JAPANESE TEXT |
| 79 | AUX-V | BINARY | |
| 80 | SYS. | ECCTB | EDIT INFO./SUBCODE DATA |
| 81 | SYS. | RESERVED | |
| 82 | SYS. | RESERVED | |
| 83 | SYS. | RESERVED | |
| 84 | RES. | RESERVED | |
| : | RES. | RESERVED | |
| 119 | RES. | RESERVED | |
| 120 | AUX-M | RESERVED | |
| 121 | AUX-M | | |
| 122 | AUX-M | | |
| 123 | AUX-M | | |
| : | AUX-M | | |
| 126 | AUX-M | | |
| 127 | AUX-N | NULL | NULL PACKET |

FIG. 14

| DATA # | DESCRIPTION | | REMARKS |
|---|---|---|---|
| 0. | AUDIO FRAME PACKET KEYWORD | 1 | KEYWORD = 64 |
| 1. | LENGTH | 1 | 92 |
| 2. | VTR MODE | 1 | OPERATION MODE FOR TS OUTPUT |
| 3. | ATNF (FLE+ATN+FLG) | 5 | SAME CONTENTS AS VID-FRAME IN COMBINATION |
| 8. | EXTENDED TRACK NUMBER | 3 | SAME CONTENTS AS VID-FRAME IN COMBINATION |
| 11. | TTC | 5 | SAME CONTENTS AS VID-FRAME IN COMBINATION |
| 16. | | | |
| 16. | DATE/TIME ORIGINAL | 10 | IN THE ORDER OF DATE(5B) + TIME(5B) KW 1B+ |
| 26. | DATE/TIME MAIN | 8 | IN THE ORDER OF DATE(4B) + TIME(4B) |
| 34. | GENERATION NUMBER | 1 | INCLUDES 2 BITS FOR COPYRIGHT |
| 35. | | | |
| 35. | STATUS INFO 1 (WITH HISTORY) | 1 | CONNECTION POINT INCLUDING EDIT: 0, 1 TO 7f COUNTUP |
| 36. | STATUS INFO 2 (WITHOUT HISTORY) | 1 | REC START POINT IN EDIT MODE: 0, 1 TO 7f COUNTUP |
| 37. | AUDIO MODE | | 10 (TOTAL BYTE) |
| 37. | AUDIO FRAME SIZE | 2 | NO. OF AAU SAMPLES (ONLY LPCM HAS MEANING) |
| 39. | SAMPLING FREQ. | 0.375 | |
| 39. | QUANTIZATION | 0.625 | (5 BITS) VALUE = 0 TO 31 BITS |
| 40. | AUDIO CHANNEL MODE | 0.5 | |
| 40. | AUDIO COMP MODE | 0.5 | |
| 41. | BIT-RATE INDEX | 0.5 | |
| 41. | RESERVED | 0.5 | |
| 42. | AUDIO SOURCE CONTROL | 1 | SUBSTANTIALLY SAME DEFINITION AS DV |
| 43. | | | |
| 43. | RESERVED | 4 | |
| 47. | DECODING REFERENCE INFO | | 11 (TOTAL BYTE) |
| 47. | AUDIO FRAME NO. (FIRST) | 3 | INTEGRATED VALUE OF GOAF |
| 50. | NO. OF AUDIO FRAMES | 1 | GOAF: NO. OF AAUs RECORDED IN SUCCESSION |
| 51. | PTS | 5 | |
| 56. | AUDIO PTS COMPENSATION | 2 | |
| 58. | | | |
| 58. | RESERVED (AUD-FRAME) | 3 | |
| 94. | | | |
| | TOTAL | 94 | |

FIG. 15

| DATA # | DESCRIPTION | NO. OF BYTES | REMARKS |
|---|---|---|---|
| 0.0 | VIDEO FRAME PACKET KEYWORD | 1 | KEYWORD = 68 |
| 1.0 | LENGTH | 1 | 92 |
| 2.0 | VTR MODE | 1 | OPERATION MODE FOR TS OUTPUT |
| 3.0 | ATNF (FLE+ATN+FLG) | 5 | INFORMATION ON ETN (EFN) POSITION CORRESPONDING TO DTS TIME |
| 8.0 | ETN 8 (EXTENDED TRACK NUMBER) | 3 | EFN CORRESPONDING TO TTC AT DTS TIME |
| 11.0 | TTC | 5 | TTC AT DTS TIME |
| 16.0 | BINARY GROUP | 5 | ONE IN CORRESPONDING FRAME WHEN TTC IS TC |
| 21.0 | | | |
| 21.0 | DATE/TIME ORIGINAL | 10 | IN THE ORDER OF DATE(5B) + TIME(5B) KW 1B |
| 31.0 | DATE/TIME MAIN | 8 | IN THE ORDER OF DATE(4B) + TIME(4B) |
| 39.0 | GENERATION NUMBER | 1 | INCLUDES 2 BITS FOR COPYRIGHT |
| 40.0 | | | |
| 40.0 | STATUS INFO 1 (WITH HISTORY) | 1 | CONNECTION POINT INCLUDING EDIT: 0, 1 TO 7f COUNTUP |
| 41.0 | STATUS INFO 2 (WITHOUT HISTORY) | 1 | REC START POINT IN EDIT MODE: 0, 1 TO 7f COUNT UP |
| 42.0 | SEARCH DATA MODE | 1 | SEARCH REC PATTERN |
| 43.0 | | | |
| 43.0 | VIDEO PACK INFO. | | 11 |
| 43.0 |    PACK FRAME NUMBER | 1 | NO. OF FRAMES IN PACK, FF: NO INFO |
| 44.0 |    Picture_Number_from_I-pic | 1 | NO. OF FRAMES FROM IMMEDIATELY PRECEDING I-pic |
| 45.0 |    1ST FRAME HEADER | | |
| 45.0 |    DATA-H | 1 | |
| 46.0 |    VBV DELAY | 2 | |
| 48.0 |    HEADER SIZE | 1 | FOR CORRECTING DIFFERENCE IN VBV DELAY HEADER SIZE |
| 49.0 |    DTS | 5 | |
| 54.0 | VIDEO MODE | 16 | |
| 70.0 | | | |
| 70.0 | EXTENDED DV PACK ENABLE | 1 | DV PACKET ENABLE b0 TO b2: 1 TO 3 ENABLE: 1 |
| 71.0 | EXTENDED DV PACK | 15 | CLOSED CAPTION 4 BYTES + 1KW/FRAME X3 |
| 86.0 | | | |
| 86.0 | RESERVED (FOR VID-FRAME) | 8 | |
| 94.0 | | | |
| | TOTAL | 94 | |

FIG. 16

| SEARCH DATA (SEARCH REC PATTEN) |
|---|
| b0: x4 OPTION |
| b1: x8 MAIN DATA |
| b2: x8 HELPER DATA |
| b3: x16 OPTION |
| b4: x24 OPTION |
| b5: x32 OPTION |
| b6-7: RESERVED |

FIG. 17

| DATA-H | b3-0 | |
|---|---|---|
| 0: RESERVED | 8: NO PICTURE | STUFFING PACK |
| 1: I-PICTURE | 9: NO EDITABLE | |
| 2: P-PICTURE | a: RESERVED | |
| 3: B-PICTURE | b: RESERVED | A-END |
| 4: COPY PICTURE | c: RESERVED | REC-END |
| 5: V-END | d: RESERVED | AUD |
| 6: RESERVED | e: RESERVED | AUX |
| 7: NO INFO. | f: RESERVED | |

FIG. 18

| DESCRIPTION | NO. OF BYTES | REMARKS |
|---|---|---|
| ECCTB PACKET HEADER | 1 | DATA = 80 |
| LENGTH (PACKET DATA) | 1 | DATA = 93 |
| SUBCODE INFORMATION | | SAME CONTENTS AS SUBCODE OF 1ST TRACK OF ECC |
| ATNF (FLE+ATN+FLG) | 5 | RECORDS VALUE OF 1ST TRACK OF ECC |
| EXTEND TRACK NUMBER | 3 | DITTO |
| TTC | 5 | SAME AS SUBCODE OF 1ST TRACK OF ECC |
| BINARY GROUP | 5 | WRITTEN TO THE SAME SUBCODE AS TTC |
| DATE/TIME ORIGINAL | 10 | DATE/TIME OF ORIGINAL REMAINS UNCHANGED AFTER COPYING |
| DATE/TIME MAIN | 8 | (USED FOR DISPLAY) |
| GENERATION NUMBER | 1 | INCREMENTS +1 EACH TIME LAST MODIFY IS UPDATED |
| EDITABLE HEADER MAP | | 25 |
| Picture_Number_from_I_pic | 1 | NO. OF FRAMES FROM IMMEDIATELY PRECEDING I-PIC |
| 1ST EDITABLE HEADER | | |
| DATA-H | 1 | PES-VIDEO |
| VBV DELAY | 2 | |
| HEADER SIZE | 1 | FOR CORRECTING DIFFERENCE IN VBV DELAY HEADER SIZE |
| DTS | 5 | |
| CONTINUITY COUNTER | 1 | b7-4: AUDIO, b3-0: VIDEO |
| POSITION (SB) | 1 | AUD-FRAME PACKET (EDIT AUX POSITION) |
| POSITION (TRACK) | 1 | |
| 2ND EDITABLE HEADER | | |
| DATA-H | 1 | PES VIDEO |
| VBV DELAY | 2 | |
| HEADER SIZE | 1 | FOR CORRECTING DIFFERENCE IN VBV DELAY HEADER SIZE |
| DTS | 5 | |
| CONTINUITY COUNTER | 1 | b7-4: AUDIO, b3-0: VIDEO |
| POSITION (SB) | 1 | AUDIO AUX (2ND EDIT FIRST DATA POSITION) |
| POSITION (TRACK) | 1 | |
| EDIT STATUS ECC | 1 | 0 AT EDIT POINT; COUNTS FOR EACH ECC UP TO 7f |
| SEARCH DATA MODE | 1 | SEARCH REC PATTERN |
| SEARCH PCS | 1 | INDICATES SEARCH DATA RECORD INFORMATION |
| SEARCH DATA BLOCK NUMBER | 1 | x8 SPEED DATA DIVISION NOS.(1 TO 9) 00, FF: NO INFO. |
| VIDEO MODE | 16 | SAME CONTENTS AS IN VID-FRAME AUDIO MODE |
| AUDIO MODE | 10 | SAME CONTENTS AS IN AUD-FRAME VIDEO MODE |
| RESERVED | 1 | |
| TOTAL | 95 | |

FIG. 19

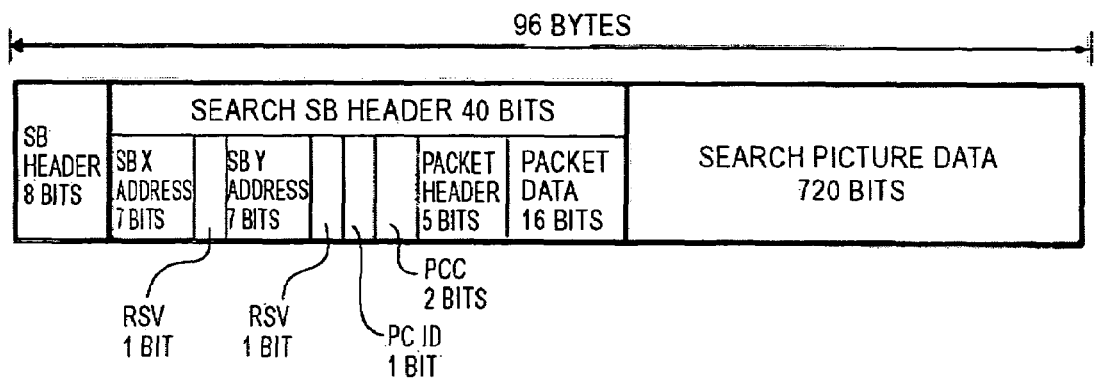

FIG. 20

| PACKET HEADER | DESCRIPTION | L/H | REMARKS | |
|---|---|---|---|---|
| 0 | SH | L | SEARCH HEADER (IMAGE INFORMATION) | |
| 1 | SH | H | SEARCH HEADER (IMAGE INFORMATION) | |
| 2 | TTC | L | DESCRIPTION OF SUBCODE | ⎫ |
| 3 | TTC | H | | |
| 4 | REC TIME | L | | |
| 5 | REC TIME | H | | FOR DISPLAY |
| 6 | REC DATE | L | | |
| 7 | REC DATE | H | | ⎭ |
| 8 | ATN+FLG | L | | ⎫ |
| 9 | ATN+FLG | H | | |
| 10 | ETN | L | | |
| 11 | ETN | H | | FOR SEARCH |
| 12 | BINARY GP | L | | POSITIONAL |
| 13 | BINARY GP | H | | INFORMATION |
| 14 | PART NO. | L | (FOR RECORDED TAPE) | |
| 15 | PART NO. | H | (FOR RECORDED TAPE) | |
| 16 | CHAPTER START | L | (FOR RECORDED TAPE) | |
| 17 | CHAPTER START | H | (FOR RECORDED TAPE) | ⎭ |
| 16~31 | RESERVED | | RESERVED | |

| | MSB LSB |
|---|---|
| SYNC PATTERN S0 | 1 0 0 1 1 1 1 1 1 1 1 1 0 0 0 0 |
| SYNC PATTERN S1 | 0 1 1 0 0 0 0 0 0 0 0 0 1 1 1 1 |

FIG. 23

| SB No. | ID0 | | ID1 | | ID2 | |
|---|---|---|---|---|---|---|
| | MSB | LSB | MSB | LSB | MSB | LSB |
| 0 | F_TYPE | TRACK PAIR NUMBER | RESERVED | SB NUMBER | OVERWRITE PROTECT | OVERWRITE PROTECT |
| 1 | F_TYPE | TRACK PAIR NUMBER | RESERVED | SB NUMBER | OVERWRITE PROTECT | OVERWRITE PROTECT |
| 2 | F_TYPE | TRACK PAIR NUMBER | RESERVED | SB NUMBER | OVERWRITE PROTECT | OVERWRITE PROTECT |
| 3 | F_TYPE | TRACK PAIR NUMBER | RESERVED | SB NUMBER | OVERWRITE PROTECT | OVERWRITE PROTECT |
| 4 | F_TYPE | TRACK PAIR NUMBER | RESERVED | SB NUMBER | OVERWRITE PROTECT | OVERWRITE PROTECT |
| 5 | F_TYPE | TRACK PAIR NUMBER | RESERVED | SB NUMBER | OVERWRITE PROTECT | OVERWRITE PROTECT |
| 6 | F_TYPE | TRACK PAIR NUMBER | RESERVED | SB NUMBER | OVERWRITE PROTECT | OVERWRITE PROTECT |
| 7 | F_TYPE | TRACK PAIR NUMBER | RESERVED | SB NUMBER | OVERWRITE PROTECT | OVERWRITE PROTECT |
| 8 | F_TYPE | TRACK PAIR NUMBER | RESERVED | SB NUMBER | OVERWRITE PROTECT | OVERWRITE PROTECT |
| 9 | F_TYPE | TRACK PAIR NUMBER | RESERVED | SB NUMBER | OVERWRITE PROTECT | OVERWRITE PROTECT |

FIG. 24

|  | EVEN PAIR TRACK 0 | | ODD PAIR TRACK 1 | |
|---|---|---|---|---|
|  | 0 | 1 | 2 | 3 |
| SB No. | EVEN-PAIR 1ST TRACK | EVEN-PAIR 2ND TRACK | ODD-PAIR 1ST TRACK | ODD-PAIR 2ND TRACK |
| 0 | FLE+ATNF | FLE+ATNF | FLE+ATNF | FLE+ATNF |
| 1 | ETN | ETN | TTC | TTC |
| 2 | TTC | TTC | REC DATE | REC DATE |
| 3 | NO INFO | NO INFO | REC TIME | REC TIME |
| 4 | FLE+ATNF | FLE+ATNF | FLE+ATNF | FLE+ATNF |
| 5 | TTC | TTC | ETN | ETN |
| 6 | ETN | ETN | TTC | TTC |
| 7 | TTC | TTC | REC DATE | REC DATE |
| 8 | NO INFO | NO INFO | REC TIME | REC TIME |
| 9 | FLE+ATNF | FLE+ATNF | FLE+ATNF | FLE+ATNF |

FIG. 25

| BYTE POS. NO. | FIXED DATA AREA (RECORDED IN NON-PACKET STRUCTURE) | | | | | | | |
|---|---|---|---|---|---|---|---|---|
|  | 7 | 6 | 5 | 4 | 3 | 2 | 1 | 0 |
| D0 | FLE | | | | | | | |
| D1 | | | | | | | LSB | BF |
| D2 | ATN 23 BITS (BINARY) | | | | | | | |
| D3 | MSB | | | | | | | |
| D4 | FLG | | | | | | | |

FIG. 26

| | | FLE: FLAFG EXTENSION | |
|---|---|---|---|
| BIT | NAME | DESCRIPTION OF DATA | DETAILED DATA |
| 7 | SF1 | PRESENCE OF x8 SEARCH HELPER | 0: HELPER IS PRESENT, 1: HELPER IS ABSENT |
| 6 | SF2 | PRESENCE OF x24 SEARCH DATA | 0: DATA IS PRESENT, 1: DATA IS ABSENT |
| 5 | SPH | x24 SEARCH PHASE (0 – 2) | COUNTER OF 3 CYCLES, 0, 1, AND 2, REMAINDER FROM DIVIDING THE QUOTIENT, WHICH IS OBTAINED BY DIVIDING ETN BY 16, FURTHER BY 3 |
| 4 | | | |
| 3 | EPO | EDITABLE PICTURE OFFSET (0 – 15) | PHASE DIFFERENCE FROM MAIN DATA CHANGES FOR EACH FRAME 15=NO INFO |
| 2 | | | |
| 1 | | | |
| 0 | | | |

FIG. 27

| | | FLG | |
|---|---|---|---|
| BIT | NAME | DESCRIPTION OF DATA | DETAILED DATA |
| 7 | I | INDEX ID | SEARCH POINT MARK (CORRESPONDING TO DV) |
| 6 | - | RESERVED | |
| 5 | P | PP ID | STILL IMAGE SEARCH MARK (CORRESPONDING TO DV) |
| 4 | - | RESERVED | |
| 3 | EF | REC END ECC FLAG | GENERATED USING ALTAIR |
| 2 | PF | PICTURE TYPE FLAG (0 – 7) | GENERATED USING ALTAIR 1=I-PIC, 2=B-PIC, 3=P-PIC, 4=C-PIC, 5=V-END, 7=NO INFO |
| 1 | | | |
| 0 | | | |

FIG. 28

| BYTE POS. NO. | ETE: EXTENDED TRACK NUMBER | | | | | | | |
|---|---|---|---|---|---|---|---|---|
| | 7 | 6 | 5 | 4 | 3 | 2 | 1 | 0 |
| D0 | 0 | 0 | 7 | | | | | |
| D1 | | | | | | | | LSB |
| D2 | ETN 24 BITS | | | | | | | |
| D3 | MSB | | | | | | | |
| D4 | RESERVED | | | | | | | |

FIG. 29

| | TITLE 3: TIME CODE : TTC OR TC | | | | | | | |
|---|---|---|---|---|---|---|---|---|
| | 7 | 6 | 5 | 4 | 3 | 2 | 1 | 0 |
| PC0 | 0 | 0 | 0 | 1 | 0 | 0 | 1 | 1 |
| PC1 | S2/BF | S1 | F + POSITION | | FRAMES − POSITION | | | |
| PC2 | S3 | SEC + POSITION | | | SECONDS − POSITION | | | |
| PC3 | S4 | MIN + POSITION | | | MINUTES − POSITION | | | |
| PC4 | S6 | S5 | H + POSITION | | HOURS − POSITION | | | |

VIDEO TAPE RECORDER AND RECORDING METHOD

BACKGROUND OF THE INVENTION

1. Technical Field

The present invention relates to a video tape recorder and a recording method for a magnetic tape, and is particularly applicable to a video tape recorder for recording HDTV (High Definition TeleVision) video signals onto a magnetic tape. According to the present invention, at least reproduction standard management information is recorded in the order of pictures of video data to be reproduced and output in a main sector, and in the order of pictures of compressed video data in a subcode sector, thereby permitting an efficient configuration to be accomplished as a whole. Moreover, search data is recorded on the basis of time management information of video data at the time of decoding, and display data is recorded on the basis of time management information of reproduction and output of video data, thereby permitting an efficient configuration to be accomplished as a whole.

2. Background Art

Hitherto, a video tape recorder for recording and reproducing HDTV video signals (hereinafter referred to as "HD signals") has been proposed in, for example, Japanese Unexamined Patent Application Publication No. 2001-291335.

The Japanese Unexamined Patent Application Publication No. 2001-291335 has disclosed a video tape recorder adapted to effectively use a magnetic tape in recording HD signals by recording all various types of signals related to the HD signals together in a first region of a plurality of interleaved tracks on a basis of P-picture array cycle.

However, the video tape recorder for recording this type of HD signals is considered to require further ingenuity for making it commercially practical. Specifically, achieving a more efficient recording/reproducing system is considered to make it possible to simplify the whole construction and further to simplify diverse types of processing.

DISCLOSURE OF INVENTION

The present invention has been made in consideration of the aforementioned, and it is an object thereof to propose a video tape recorder and a recording method that allows an entire system to be efficiently configured.

To this end, according to the present invention, there is provided a video tape recorder including a pack unit generating means for generating a pack unit by forming compressed video data into a block for each predetermined number of pictures and combining the compressed video data of the block, compressed audio data corresponding thereto, and corresponding auxiliary data, and a recording system that allocates data from the pack unit to a main sector and allocates auxiliary data of the pack unit to a subcode sector to sequentially form recording tracks based on the main sector and the subcode sector, wherein the auxiliary data of the main sector includes at least reproduction standard management information, which corresponds to time management information of video data at the time of decoding, that is arranged in the order of pictures of video data, while the auxiliary data of the subcode sector includes at least the reproduction standard management information and picture type information that are arranged in the order of pictures of compressed video data.

Applying the construction in accordance with the present invention to a video tape recorder makes it possible to process video data, the audio data corresponding thereto, and corresponding auxiliary data on a pack unit basis by providing the pack unit generating means for generating a pack unit by forming compressed video data into a block for each predetermined number of pictures and combining the compressed video data of the block, compressed audio data corresponding thereto, and corresponding auxiliary data, and a recording system that allocates data from the pack unit to a main sector and allocates auxiliary data of the pack unit to a subcode sector to sequentially form recording tracks based on the main sector and the subcode sector. At this time, the auxiliary data of the main sector arranges the reproduction standard management information corresponding to the time management information of video data at the time of decoding in the order of pictures of the video data, while the auxiliary data of the subcode sector arranges at least the reproduction standard management information and picture type information in the order of the pictures of compressed video data. Thus, at the time of reproduction, the video data can be reproduced and decoded simply by processing the pictures according to the reproduced corresponding auxiliary data, making it possible to simplify the processing and construction of the reproducing side. This permits the entire system to be efficiently configured.

The video tape recorder in accordance with the present invention further includes a search data generating means for generating search data from data of a picture by encoding in a frame in the video data, and an auxiliary data generating means for generating search auxiliary data related to the search data, wherein the pack unit generating means further combines the search data and the auxiliary data to generate the pack unit, and among the auxiliary data of the search data, search data of the video data recorded on the magnetic tape is recorded on the basis of the time management information of the video data at the time of decoding, while display data to be displayed together with an image by the search data is recorded on the basis of the time management information of the reproduction and output of the video data.

With this arrangement in accordance with the present invention, search data and its corresponding auxiliary data can be processed on a pack unit basis by providing the search data generating means for generating search data from data of a picture by encoding in a frame in the video data, and an auxiliary data generating means for generating search auxiliary data related to the search data, wherein the pack unit generating means further combines the search data and the auxiliary data to generate the pack unit, and among the auxiliary data of the search data, search data of the video data recorded on the magnetic tape is recorded on the basis of the time management information of the video data at the time of decoding. Among the search auxiliary data, the search data of the video data recorded on the magnetic tape is recorded on the basis of the time management information of the video data at the time of decoding, while display data to be displayed together with an image by the search data is recorded on the basis of the time management information of the reproduction and output of the video data. With this arrangement, simply displaying sequentially reproduced display data in order at the time of reproduction makes it possible to easily select a desired scene in chronological order, and also to easily access search data corresponding to the scene detected as described above, thus allowing the construction of the reproducing side to be simplified. Thus, the entire system can be efficiently configured.

According to the present invention, there is provided a method for recording to a magnetic tape, including a data compressing step for compressing video data and audio data to generate compressed video data and compressed audio data, and a pack unit generating step for forming compressed video data into a block for each predetermined number of pictures and combining compressed video data of the block, corresponding compressed audio data, and corresponding auxiliary data so as to generate a pack unit, and a recording step for allocating data of a pack unit to a main sector and allocating auxiliary data of the pack unit to a subcode sector so as to sequentially form recording tracks based on the main sector and the subcode sector, wherein the auxiliary data of the main sector arranges at least reproduction standard management information corresponding to the time management information of video data at the time of decoding in the order of pictures of the video data, while the auxiliary data of the subcode sector arranges at least the reproduction standard management information and picture type information in the order of pictures of the compressed video data.

This arrangement in accordance with the present invention makes it possible to provide a recording method that allows an entire system to be efficiently configured.

BRIEF DESCRIPTION OF THE DRAWINGS

FIG. 5 is a chart showing a sync pattern.

FIG. 6 is a chart showing IDs.

FIG. 7 is a chart showing a sync block header.

FIG. 8 is a chart showing average logic data allocation in the main sector.

FIG. 10 is a chart showing a packet structure based on a fixed length.

FIG. 11 is a chart showing a packet structure based on a variable length.

FIG. 12 is a chart showing keyword numbers.

FIG. 13 is a chart showing keyword numbers in the packet structure based on a variable length.

FIG. 14 is a chart showing an audio frame packet.

FIG. 15 is a chart showing a video frame packet.

FIG. 16 is a chart provided for explaining a search mode.

FIG. 17 is a chart provided for explaining search data.

FIG. 18 is a chart showing an ECCTB packet.

FIG. 19 is a chart showing a sync block structure applied when search data is allocated to main data.

FIG. 20 is a chart showing a packet header.

FIG. 23 is a chart showing subcode sector IDs.

FIG. 24 is a chart showing details of subcode data of the subcode sector.

FIG. 25 is a chart showing a structure of subcode data related to subcode sync block numbers 0, 4, and 9.

FIG. 26 is a chart showing flag settings.

FIG. 27 is a chart showing flag settings of least significant bits.

FIG. 28 is a chart showing a subcode constituted by assigning extended track numbers.

FIG. 29 is a chart showing a subcode constituted by assigning title time codes.

BEST MODE FOR CARRYING OUT THE INVENTION

The following will describe embodiments according to the present invention in detail with reference to the accompanying drawings, as appropriate.

(1) Construction of a First Embodiment (1-1) Recording Format

Figure 1:
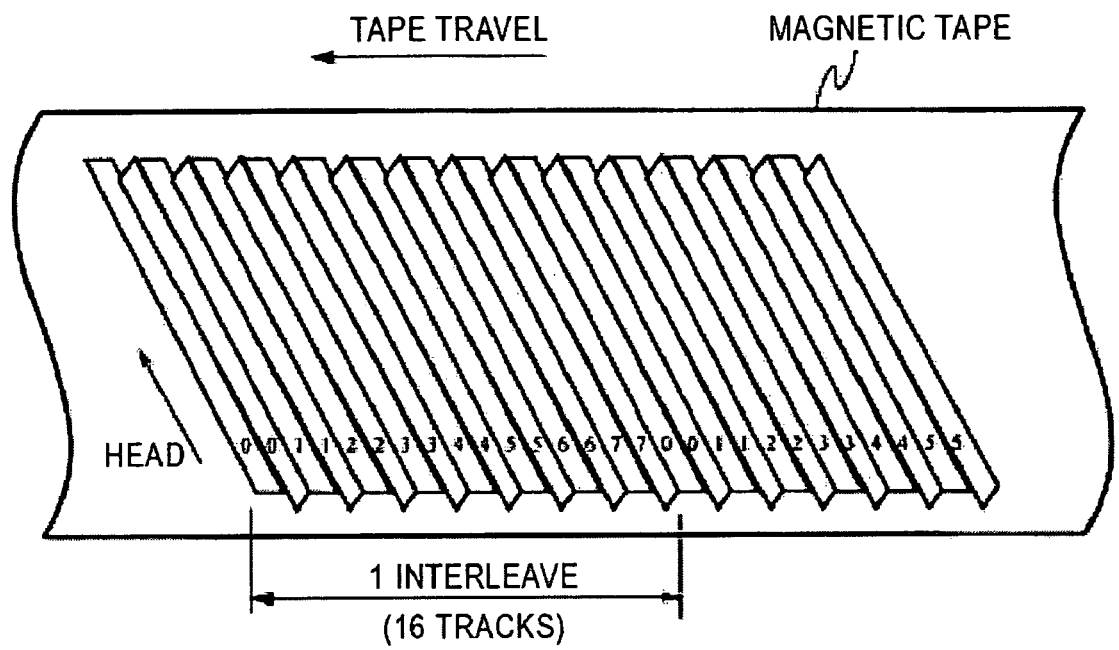
FIG. 1 is a plan view showing a tape format in a video tape recorder according to an embodiment of the present invention.

FIG. 1 is a plan view showing a recording format on a magnetic tape used by a video tape recorder according to an embodiment of the present invention. The video tape recorder is adapted to use substantially the same magnetic tape running system as that of a DV (Digital Video) type video tape recorder. Thus, in the DV type video tape recorder, a pair of inclined tracks (a track pair) having positive and negative azimuth angles is sequentially formed on a magnetic tape according to substantially the same track pattern. In the figure, Head indicates the scanning direction of a magnetic head, and Tape travel indicates the running direction of the magnetic tape. The recording tracks are sequentially formed at a speed of about 300 tracks per second, and the recording rate relative to the magnetic tape is set to about 40 [Mbps].

Cyclically, a recording track with no pilot signals recorded therein, a recording track with a pilot signal of a frequency F0 recorded therein, and a recording track with a pilot signal of a frequency F1 recorded therein are sequentially formed on the magnetic tape. This allows the magnetic tape to be tracking-controlled on the basis of the pilot signals. The frequencies F0 and F1 are set such that recording frequencies will be 1/90 and 1/60 relative to the recording frequencies of channel bits of data to be recorded in recording tracks.

In this video tape recorder, among the track rows formed as described above, 16 tracks are set to be an interleaving processing unit and an error correction processing unit (ECC block). Thus, the data recorded in 16 tracks is sequentially put together in one block, so that the interleaving or the error correction processing are carried out in each block. Furthermore, in the recording tracks, each track pair is cyclically assigned sequence track pair numbers of values 0 to 31. The track pair numbers of the first track pairs of interleaves are set to the value of 0, 7, 15 or the value 23.

Figure 2:
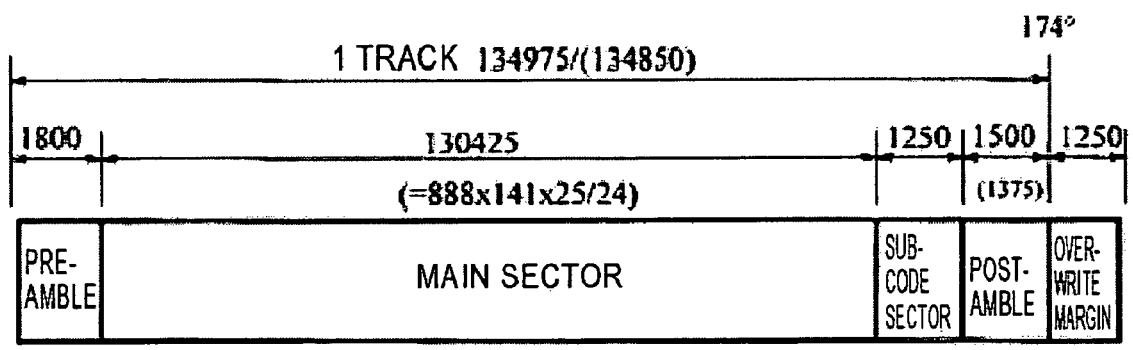
FIG. 2 is a chart showing a sector layout in the tape format shown in FIG. 1.

FIG. 2 is a chart showing a sector format in each recording track formed as mentioned above. In the recording track, a preamble, main sector, a subcode sector, a postamble, and an overwrite margin are formed in sequence from the end where the scanning by the magnetic head begins. In the recording track, these preamble, the main sector, the subcode sector, and the postamble are allocated to the range defined by the winding angle of 174 degrees of the magnetic tape onto a rotating drum from the scanning start side. In this range, 134975 bits of data are recorded when video data whose field frequency is 59.94 [Hz] in terms of the volume of data after subjected to 24-25 conversion, which will be discussed hereinafter (when a rotating drum mounted on the magnetic head rotates at a rotational speed of 60×1000/1001 [Hz]). If video data whose field frequency is 50 [Hz] is recorded (when the rotating drum rotates at a rotational speed of 60 [Hz]), then 134850 bits of data are recorded.

Figures 3, 4:
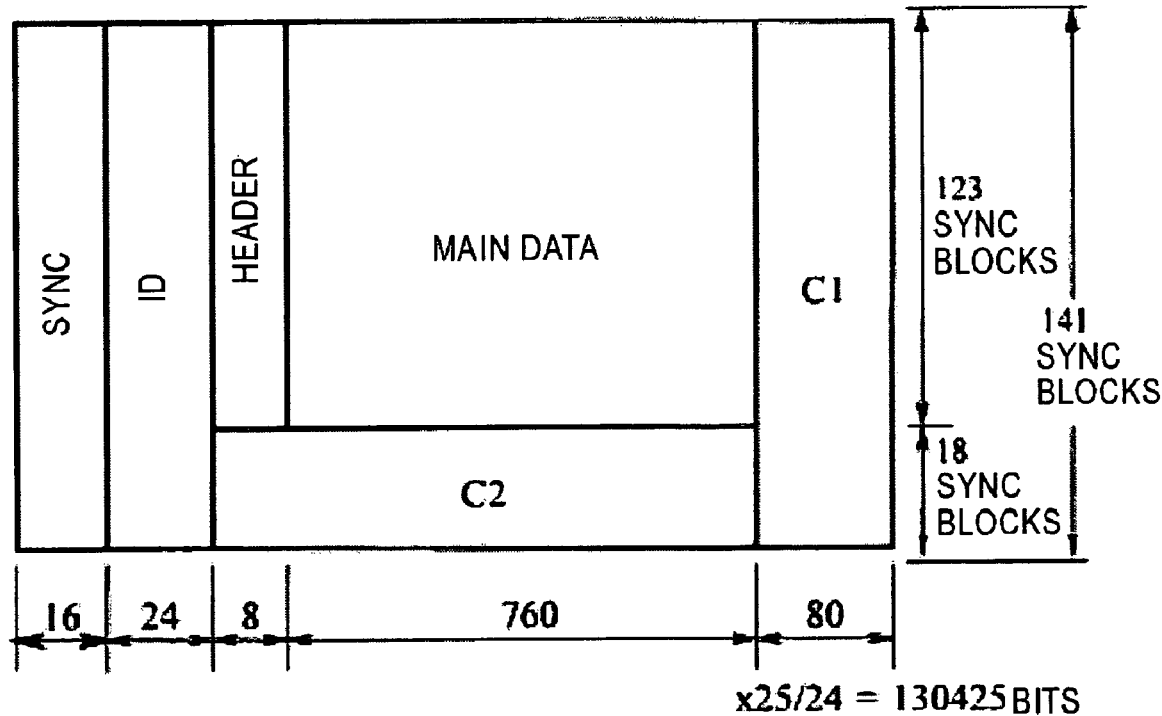
FIG. 3 is a chart showing preamble patterns.
FIG. 4 is a chart showing a structure of a main sector.

Here, as the preamble, 1800 bits of data required for locking a PLL circuit is recorded at the time of reproduction. FIG. 3 is a chart showing the recording pattern of the preamble. In the present embodiment, a combination of pattern A and pattern B having bits reversed from those of the pattern A is allocated to each recording track, and this is added to a combination of the aforementioned pilot signals to form the preamble.

The main sector is formed such that video data or the like used for regular reproduction or search is recorded in units of sync blocks, which will be described later, and secures 130425 bits as a whole. A subcode sector applies to recording of a subcode, which is the data used for position search or the like in quick search, and secures a region for 1250 bits. The postamble secures a region for 1500 bits when the rotating drum rotates at a rotational speed of 60×1000/1001 [Hz] (when the field frequency is 59.94 [Hz]), or secures a region for 1375 bits when the rotating drum rotates at a rotational speed of 60 [Hz] (when the field frequency is 50 [Hz]). The postamble has the same configuration as the preamble.

The overwrite margin is provided to secure a margin for overwrite, and secures a region for 1250 bits.

FIG. 4 is a chart showing a basic structure of the main sector. FIG. 4 is based on the volume of data before the 24-25 modulation. Here, the main sector is constructed of 141 sync blocks, each including 888 bits (111 bytes). Each sync block has a 16-bit sync and a 24-bit ID allocated to the top, and C1 code, which is an internal code of a product code type error correction code, is allocated to the ending 80 bits. In 123 sync blocks out of the 141 sync blocks in the main block, an 8-bit header (sync block header) and 760-bit main data are allocated to the remaining 768 bits, while C2 code, which is an external code of the product code type error correction code, is allocated to the remaining 18 sync blocks.

The syncs are provided to detect the top of each sync block, and a pattern M0 and a pattern M1 having bits reversed from those of the pattern M0, as shown in FIG. 5, are alternately allocated.

The IDs are provided primarily for identifying sync blocks, as auxiliary data for error correction, each ID being formed of three types ID0 to ID2 shown in FIG. 6. More specifically, in each ID, the first 0 through 7 bits are set to the first ID0, and the first 0 through 4 bits of the first ID0 denote a track pair No. (Track Pair Number).

In each ID, the track format described above in conjunction with FIG. 2 is recorded by the first 5 through 7 bits of the first ID0. Thus, the identification information on a track is allocated to the first ID0.

A sync block number for identifying a sync block is allocated to the second ID1.

Allocated as an overwrite protect to the third ID2 is the information for identifying whether a main sector is one that has been newly created or a remainder from previous data overwritten by editing or the like. With this arrangement, in the video tape recorder, if previous data could not be completely erased due to a head clock or the like when recording by overwrite, then an eraser correction is made only by the C2 code so as not to erroneously reproduce the previous data.

FIG. 7 is a chart showing a sync block header. In the sync block header, a data type, which is the type of main data, is indicated by b7 to b5 bits, and detailed information in each data type is given by b4 to b0 bits. More specifically, if an empty sync block is formed by allocating NULL data, which is the data meaning nothing to main data, b7 to b5 bits are set to a value 0, and b4 to b0 bits are allocated to Reserved.

If auxiliary data (AUX) of video data or audio data is allocated to main data, then the b7 to b5 bits are set to a value 1. In this case, a mode (AUX mode) of the auxiliary data is allocated to the b4 to b2 bits. Here, if the auxiliary data is the auxiliary data (AUX-V) related to PES (Packetized Elementary Stream) video data, then the b4 to b2 bits are set to the value 0. If the auxiliary data is the auxiliary data (AUX-A) related to the PES audio data, then the b4 to b2 bits are set to the value 1. The PES video data and the PES audio data are video data and audio data primarily recorded/reproduced by the video tape recorder according to the present embodiment, and are video data and audio data that comply with an MPEG2-PES format.

If the auxiliary data is the first half of a PSI (Program Specific Information) packet of MPEG2-PES, then the b4 to b2 bits are set to a value 2, or if it is the latter half PSI of the PSI packet (PES-PSI2), then the b4 to b2 bits are set to a value 3. If the auxiliary data is the data of an ECCTB packet, which will be discussed later, then the b4 to b2 bits are set to a value 4, or if large-volume meta data is allocated to auxiliary data (AUX-M), then the b4 to b2 bits are set to a value 5. Values 6 and 7 of the b4 to b2 bits are Reserved. Here, system data is the data related to control of information, including text information on copyright, shooting situations or the like, title time code (TTC) for aiding search, editing or the like, information on track positions, and information on settings on an apparatus, input from outside as additional data of pictures and sounds.

In association with the above, in this case, the b1 bit is assigned a flag DF indicating an invalid recording region to be recorded in an ECCTB or a flag FRC indicating a polarity reversion of a frame boundary in main data. The b0 bit is assigned a flag SBSC indicating an ON state of scramble control of the sync block header. The b1 bit is allocated to the flag FRC if the b4 to b2 bits are set to the value 0 or 5, or allocated to a flag DF if the b4 to b2 bits are set to the value 4, or set to Reserved in a case other than the above.

In comparison with the aforementioned, if main data is the video data based on the MPEG2-PES format (PES-VIDEO), then the b7 to b5 bits are set to the value 2. In the case of audio data in this format (PES-AUDIO), the b7 to b5 bits are set to the value 3. In these cases, the b4 bit indicates whether data is partial (below 95 bytes) or full (95 bytes). A series of count values are allocated to the b3 to b0 bits.

In comparison with the aforementioned, if main data is the first half of data recorded in a transport stream format (TS-1H), then the b7 to b5 bits are set to the value 4, jump flags are disposed at the b4 and b3 bits, and time stamps are disposed at b2 to b0. If the main data is the latter half of the data recorded in the transport stream format (TS-2H), then the b7 to b5 bits are set to the value 5, and a series of count values is set at the b4 to b0 bits.

If the main data is search data (SEARCH), then the b7 to b5 bits are set to a value 6, and b4 is set to Reserved. Corresponding search speeds are recorded to the b3 to b1 bits, while a flag SBSC indicating an ON state of the scramble control is allocated to the b0 bit. The search data is the data formed of lowpass components of I pictures and is adapted to specify ×8 and ×24 search speeds when the b3 to b1 bits take the values 2 and 4, respectively. The value 7 of the b3 to b1 bits is allocated to Reserved.

FIG. 8 is a chart showing average logical data allocation in a data structure of the main sector formed as described above. Here, a C2 code is allocated to 18 sync blocks so that a continuous error correcting capability covers two or more tracks (=12.5% (=2 tracks/16 tracks ECC (Error Correcting Code) interleave)). This sets the C2 code to 12.7 [%]. The auxiliary data (AUX)+NULL data is 95 bytes×2.2 SB×300 tracks×8 bits=501 [Kbps], the video data is 95 bytes×110 SB×300 tracks×8 bits=25.021 [Mbps], the audio data is 95 bytes×1.8 SB×300 tracks×8 bits=421 [Kbps], and the search data is 95 bytes×9.1 SB×300 tracks×8 bits=2.07 [Mbps], totaling 28.044 [Mbps] (95 bytes×123SB×300 tracks×8 bits). In the following description, the sync blocks will be denoted as SB, as appropriate.

Thus, video data, audio data and corresponding system data (auxiliary data) are sequentially allocated to the main data of the main sector so as to record them to a magnetic tape.

Figure 9:
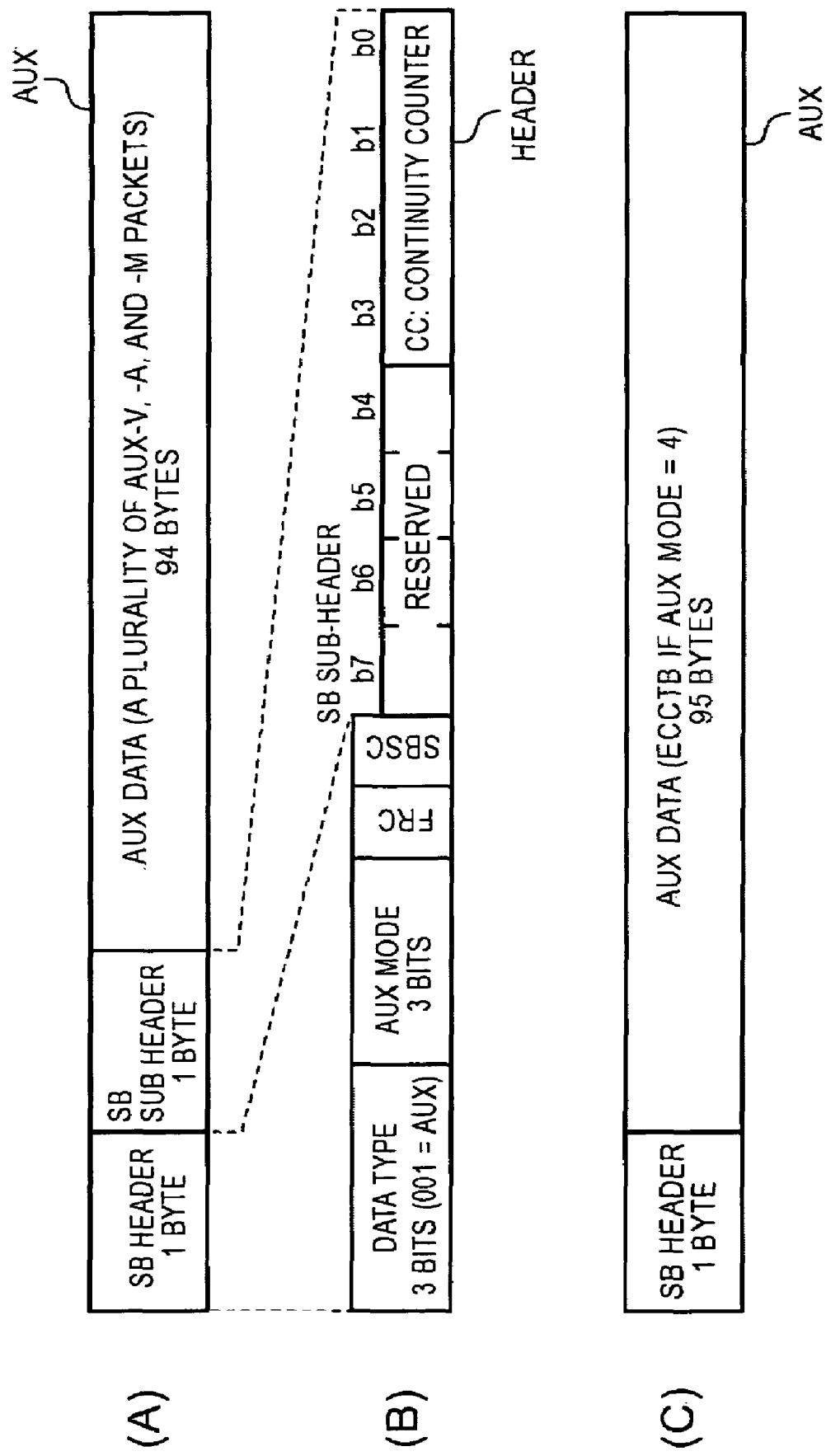
FIG. 9 is a chart showing sync block structures applied when allocating auxiliary data to main data.

FIG. 9 presents charts illustrating a sync block structure applied when auxiliary data is allocated to main data. In each sync block, if a mode of auxiliary data (AUX mode) is set to the value 0 (auxiliary data is the auxiliary data related to video data (AUX-V)), the value 1 (auxiliary data is the auxiliary data related to PES audio data (AUX-A)), or the value 5 (large-volume meta data has been allocated (AUX-M), then the first one byte of a main data area is allocated to a sub header following a sync header in each sync block (FIGS. 9(A) and (B)).

Here, regarding the sub header, b7 to b4 are allocated to Reserved, and b3 to b0 are allocated to a series of count values (CC.Continuity counter). The sub header is provided in order to detect continuity of data by a count value (CC.Continuity counter) when auxiliary data is allocated to a plurality of sync blocks. With this arrangement, the count value is independently set for each mode of auxiliary data, so that reliable reproduction can be achieved even when a plurality of pieces of auxiliary data is irregularly disposed. Incidentally, although an ECCTB packet is adapted to record auxiliary data, which is system data, it is regularly disposed and the data has continuity, thus eliminating a sub header. Here, the ECCTB packet is a sync block allocated to the recording of the start of an ECC block, which will be discussed in detail hereinafter.

Of the data allocated to the main sector as described above, auxiliary data is allocated to the main data described in conjunction with FIG. 4 by the packet structures shown in FIG. 10 and FIG. 11.

FIG. 10 and FIG. 11 are charts showing a packet structure of auxiliary data based on a fixed length and a packet structure of auxiliary data based on a variable length, respectively. The fixed-length packet structure is primarily applied to subcode sectors although it is also applied to main sectors. The entire fixed-length packet structure is composed of 5 bytes, and b7 and b6 of the first 1 byte are set to the value 0. A keyword number giving a description of each auxiliary data is allocated b5 to b0 bits, and the remaining 4 bytes are allocated to the auxiliary data.

In comparison, the variable-length packet structure has b7 and b6 bits of the first 1 byte set to the value 0 and the value 1, respectively, and a keyword number giving a description of each auxiliary data allocated to b5 to b0 bits. A number of bytes n of the subsequent auxiliary data is recorded to the subsequent 1 byte, thereby allowing the packet length to be detected. Subsequently, auxiliary data of the n bytes is allocated.

FIG. 12 is a chart showing keyword numbers in the fixed-length packet structure. A series of numbers is allocated as keyword numbers to the fixed-length packet structure and the variable-length packet structure. Values 0 to value 63 are allocated to the fixed-length packet structure. Of these values, the value 0 to the value 7 are applied to a subcode sector, the value 0 indicating that the subsequent 4 bytes provide a title time code (TTC (time information of video data and audio data)). The value 1 of a keyword number indicates that the subsequent 4 bytes provide data of a binary group, and the value 2 of the keyword number indicates that the subsequent 4 bytes provide a part number.

The value 4 of the keyword number indicates that the subsequent 4 bytes provide tape position information (ATNF), a predetermined flag (FLG). The tape position information is 23-bit absolute position information and represented by a track number (ATN: Absolute Track Number) counted up to each recording track from the beginning of a tape. The flag (FLG) is set to the value 1 if the tape position information is not continuous, thus making it possible to determine the continuity of a track row to ensure accurate search. The value 5 and the value 6 indicate that the subsequent 4 bytes provide a recording date and a recording time, respectively. The value 7 indicates that the subsequent 4 bytes provide an extended track number (ETN: Extened Track Number).

The extended track number ETN is reproduction standard management information for reproducing video data from a magnetic tape and set to have a proportional relationship with time management information of video data at the time of decoding DTS (Decoding Time Stamp) and also to have a proportional relationship with a system time clock STC (System Time Clock), which is an operational reference at the time of the decoding and also the operational reference of the video tape recorder according to a relational expression below, using values that represent the time management information DTS by track numbers. The extended track number (ETN) is represented using 24 bits. The description of the b4 to b0 bits provides a track number of an ECC, and the description of the b5 to b1 bits matches a track pair number. The track number in the ECC is the number given by setting the value 0 at the first track of the ECC. The decoding time management information DTS is a count value of a frequency 90 [kHz] and an output reference of video data decoded to be data-extended.

In relation to the title time code (TTC), when it is applied to a system having a field frequency of 59.94 [Hz], the TTC is repeatedly allocated at 10-track cycles, and the ETN is represented by an integral multiple of 10 at the write start of TTC. If it is applied to a system having a field frequency of 50 [Hz], then TTC is repeatedly allocated at 12-track cycles, and the ETN is represented by an integral multiple of 12 at a start of writing TTC.

In the present embodiment, if it is applied to the system having the field frequency of 59.94 [Hz], then the extended track number is represented as DTS=EFN×3003=ETN×3003/10. If it is applied to the system having the field frequency of 50 [Hz], then the extended track number is represented as DTS=EFN×3600=ETN×3600/12. The EFN stands for Extended Frame Number and it is a frame number associated with the extended track number ETN. In a first ID0, a value 8 to a value 62 are allocated to Reserved, and a value 63 indicates that the subsequent 4 bytes will be NULL.

FIG. 13 is a chart showing the keyword numbers in the variable-length packet structure. A value 64 to a value 127 are allocated to the variable-length packet structure. Of these keyword numbers, the value 64 to the value 67 are allocated to the auxiliary data of audio data, the value 64 indicating that auxiliary data of audio data has been allocated to the subsequent variable-length data. The remaining values 65 to 67 are allocated to Reserved.

Furthermore, the value 68 to the value 79 are allocated to the auxiliary data of video data, the value 68 indicates that the auxiliary data of the video data has been allocated to the following variable-length data, and the value 73 indicates that the subsequent variable-length data is data compatible with DV format. The value 77 and the value 78 indicate that the subsequent variable-length data is message data based on the ASCII code and the shifted JIS code, respectively, and the value 79 indicates that the subsequent variable-length data is binary data.

Further, the values 80 to 83 are allocated to a system, and the value 80 indicates that the subsequent variable-length data forms an ECCTB packet. The value 84 to the value 119 are for Reserved, and the value 120 to the value 126 indicate that the subsequent variable-length data is large-volume meta data. The value 127 indicates that the subsequent variable-length data is NULL, and a NULL packet is formed as a whole.

FIG. 14 is a chart showing an audio frame packet with the keyword number set to the value 64 among the keyword numbers set as described above. As described above regarding the packet structure shown in FIG. 11, the first one byte of the audio frame packet is set to the keyword number of the value 64, and a subsequent byte number n (=92) is allocated to the subsequent one byte. Then, an operational mode for outputting a transport stream is set, and the subsequent 5 bytes, 3 bytes, and 5 bytes are assigned a VTR mode, a tape position information (ATNF) and various flags (EFL, FLG), and a title time code, respectively, which are the same as those of an associated video frame. This arrangement makes it possible to easily identify a pack pair of associated video data in a pack unit. The pack unit means a combination of associated video data, audio data, and system data. The various flags (EFL, FLG) will be described in detail in conjunction with detailed explanation of an associated packet of a subcode, which will be discussed hereinafter.

The information on the recording date and time of the original is allocated to the subsequent 10 bytes, the information on the date and time of recording to a magnetic tape is allocated to the subsequent 8 bytes, and the information indicating the generation of copy is allocated to the subsequent 1 byte. Information on statuses related to edit points (edit information) is allocated to the subsequent 2 bytes, 1 byte for each, and an audio mode is allocated to the subsequent 6 bytes. The audio mode here refers to a frame size, a sampling frequency, or the like. The subsequent 4 bytes are allocated to Reserved, and information regarding a pack unit is allocated to the subsequent 11 bytes. The information regarding the pack unit refers to the information on a decoding reference, and includes a frame number, the number of frames, and a PTS (Presentation Time Stamp). The PTS here refers to the time management information for reproducing and outputting video data and audio data decoded to be data-extended.

FIG. 15 is a chart showing a video frame packet wherein the keyword number is set to the value 68 among the set keyword numbers described above. As discussed above in conjunction with the packet structure shown in FIG. 11, in the video frame packet, the first 1 byte is set to the keyword number of the value 68, and the subsequent byte number n (=92) is allocated to the subsequent 1 byte. Further, an operational mode for outputting a transport stream is set, and the subsequent 5 bytes, 3 bytes, and 5 bytes are assigned a VTR mode, a tape position information (ATNF) and various flags (EFL, FLG), and a title time code, respectively, which are the same as those of an associated audio frame.

A binary time code is allocated to the subsequent 5 bytes. Information on the recording date and time of the original and information on the date and time of the recording to a magnetic tape are allocated to the subsequent 10 bytes and 8 bytes, and information indicating the generation of copy is allocated to the subsequent 1 byte. In the video frame packet, subcode data to which DTS time management information is allocated is directly allocated to the 4th byte through the 39th byte. These pieces of data are directly associated with corresponding I pictures or P pictures if the corresponding video data is B pictures or C pictures.

Information on statuses related to edit points (edit information) is allocated to the subsequent 2 bytes, 1 byte for each, and a recording mode of search data is allocated to the subsequent 1 byte. The search data is allocated on the basis of search speeds, as shown in FIG. 16. Further, information regarding a pack unit is allocated to the subsequent 11 bytes. Here, the description of an MPEG video stream header is allocated to the information regarding the pack unit. Information indicating I pictures, P pictures, etc. and information indicating an end of recording (V-END) are allocated to information regarding pictures DATA-H among the above data, as shown in FIG. 17.

Information on a video mode is allocated to the subsequent 16 bytes, and additional information on a frame basis (Extended DV Pack) is allocated to the subsequent 1 byte and 15 bytes.

FIG. 18 is a chart showing an ECCTB packet having a keyword number set to a value 80. The ECCTB packet is assigned the information recorded in 16 tracks, which constitutes each interleave, and recorded at the fixed position at the top of an interleave, as described above. As discussed above in conjunction with the packet structure shown in FIG. 11, the ECCTB packet has the first 1 byte set to the keyword number of the value 80 and the subsequent byte number n (=93) allocated to the subsequent 1 byte. Further, information including the same content as that of a sub code of a first track of the interleave is recorded to the subsequent 37 bytes. The information here includes the tape position information (ATNF) and various flags (EFL, FLG), the ETN, the title time code (TTC), a binary group, information on the recording date and time of the original, information on the date and time of recording to a magnetic tape, and information indicating a generation of copy.

The subsequent 25 bytes are assigned information on edit related to video, a status regarding edit points, and a search data mode or the like, and then assigned video and audio data information (video mode) (audio mode).

FIG. 19 is a chart showing a sync block structure of search data when the search data is assigned to main data. In this case, 40 bits are allocated to a search sync block header at the top of the sync block, and the remaining 720 bits are allocated to search data. Here, the header has an X address and a Y address of a first macro block coordinates recorded in the sync block, 1 bit for Reserved being provided therebetween. Subsequently, a packet ID (PC ID), a packet header, and packet data are allocated.

Here, the packet header is set to indicate the details of the packet data, and the value 2 to the value 7 provide information for the same diverse types of display as those described above regarding keyword numbers and the value 8 to the value 11 provide position information for search, as shown in FIG. 20.

Figures 21, 22:
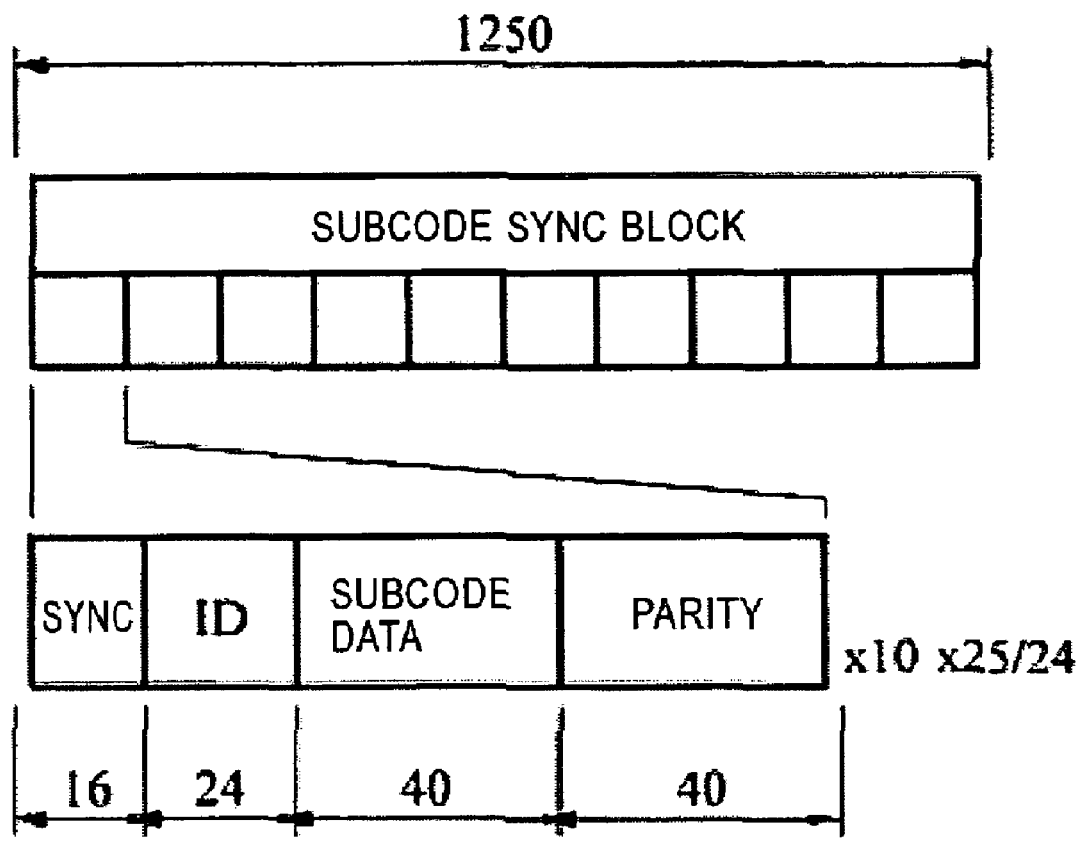
FIG. 21 is a chart showing a structure of a subcode sector.
FIG. 22 is a chart showing subcode sector sync.

FIG. 21 is a chart showing a structure of a subcode sector. The subcode sector is used, e.g., for about 200-fold quick search. The entire subcode sector is composed of 1250 bits after the 24-25 conversion, and composed of ten subcode sync blocks. In each subcode sync block, the first 16 bits are allocated to a sync, and the next 24 bits are allocated to an ID. Further, the subsequent 40 bits are allocated to subcode data and the remaining 40 bits are allocated to parity.

As shown in FIG. 22, the sync is assigned a predetermined pattern S0, which is different from syncs M0 and M1 of a main sector, and a pattern S1 having its bits reversed from those of the pattern S0, thereby allowing the main sector and the subcode sector to be distinguished from each other.

The ID of the subcode sector is formed of first through third IDs, ID0 through ID2, as shown in FIG. 23. As in the sync ID of the main sector, the first ID0 defines a format type (F TYPE) and a track pair number, respectively. The second ID1 is allocated to each subcode sync block number (SB number) in the subcode sector and to Reserved. The third ID2 is assigned overwrite protect, just like the sync ID of the main sector. Since the overwrite protect has been set, if data recorded in the subcode sector is determined to be the data left over from previous erasure, then the sync block is processed as an invalid one.

FIG. 24 is a chart showing the details of subcode data of each subcode sector. In each subcode sector, the information shown in FIG. 24 is recorded by the fixed packet structure described above in conjunction with FIG. 10. As the subcode data, an even-numbered pair of tracks and an odd-numbered pair of tracks sharing the same data are recorded in the fixed-length data format described above in conjunction with FIG. 10. However, subcode sync blocks Nos. 0, 4 and 9 have a different structure from the packet structure described above in conjunction with FIG. 10. Various flags and the tape position information (ATNF) are allocated to the subcodes of the subcode sync blocks Nos. 0, 4 and 9 in the even-numbered pair of tracks and the odd-numbered pair of tracks.

FIG. 25 is a chart showing a structure of the subcode data related to the subcode sync blocks Nos. 0, 4 and 9. In these pieces of subcode data, various flags are recorded to the first one byte. FIG. 26 is a chart showing the settings of the flags. The presence of search data and a phase difference from that of main data are recorded in the flags.

A flag BF (Blank Flag) indicating that the track numbers (ATN) based on the start of a tape are discontinuous is set at the b0 bit, the second byte. Thus, the flag BF is set to the same value for the recording once the track number becomes discontinuous. The third byte is assigned a track number (ATN) based on the beginning of the tape. The track number (ATN) is the same as that in the case of the DV type, the first 1 bit being allocated to a sign.

Various flags shown in FIG. 27 are set to the last one byte. These flags include an I flag indicating a search point, a P flag set when a still image recording start position is in main data, a PF flag indicating that an I picture or a P picture has been allocated to main data, and an EF flag related to edit.

An extended track number (ETN: Extened Track Number) is allocated to the subcodes of subcode sync blocks Nos. 1 and 6 in an even-numbered track pair and the subcode of a sub-code sync block No. 5 in an odd-numbered track pair (FIG. 24).

FIG. 28 is a chart showing a subcode having the extended track number ETN allocated thereto. In the subcode, an associated keyword number is allocated to b5 to b0 bits of the first 1 byte, and the extended track number ETN is allocated to the third byte.

In comparison with the above, a title time code (TTC) is allocated to the subcodes of subcode sync blocks Nos. 2, 5 and 7 in an even-numbered track pair and the subcode of a subcode sync blocks Nos. 1 and 6 in an odd-numbered track pair (FIG. 24).

FIG. 29 is a chart showing a subcode wherein the title time code is allocated. In this subcode, associated keyword numbers are allocated to b5 to b0 bits of the first 1 byte, and time code information is sequentially allocated to the subsequent bytes.

No information is assigned to the subcodes of the subcode sync blocks Nos. 3 and 8 in the even-numbered track pair (FIG. 24). In contrast to this, information on recording dates are allocated to the subcodes of the subcode sync blocks Nos. 2 and 7 in an odd-numbered pair of tracks, while information on recording time is allocated to the subcodes of the subcode sync blocks Nos. 3 and 8 in an odd-numbered track pair.

Figure 30:
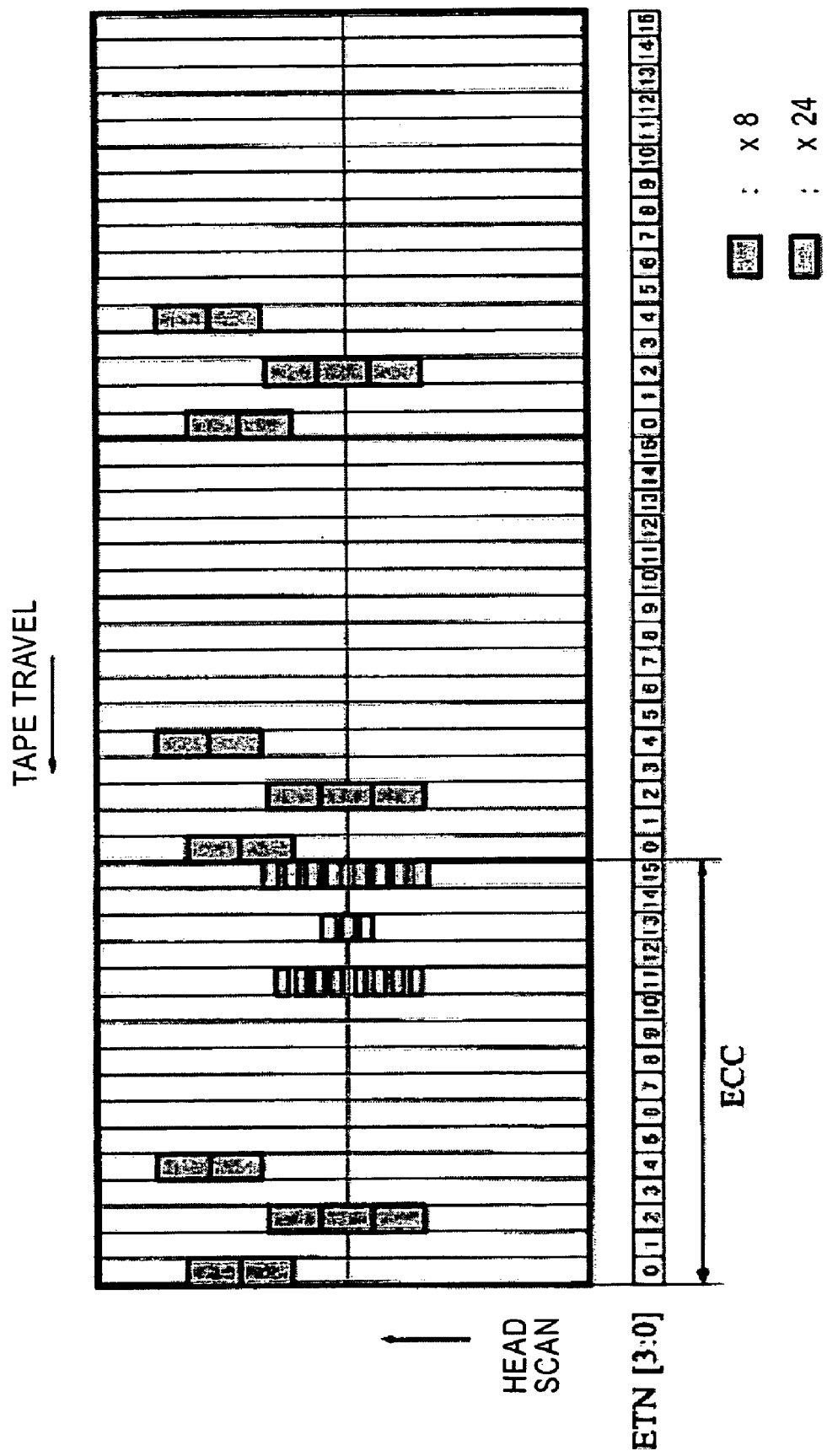
FIG. 30 is a chart showing a search data layout.

FIG. 30 is a chart showing search data layout on a magnetic tape in relation to the recording in such main sectors and subcode sectors. The recording positions of search data are defined by physical positions after interleaving. Here, ×8 speed search data is disposed one for each ECC bank (16 tracks).

To be specific, the ×8 speed search data is recorded such that the same data (data Nos. 17 to 33) for 17 sync blocks is repeatedly recorded twice each in the recording tracks of track numbers ETN[3:0]=0 and 4 in the ECC, and the data of the remaining 17 sync blocks (data Nos. 0 to 16) is repeatedly recorded three times in the recording track of a track number ETN[3:0]=2 in the ECC. Thus, 34 sync blocks (data Nos. 0 to 33) are allocated to the one ECC bank.

In case of ×24 speed search data, one piece of such data is disposed for every three EEC banks (16×3=48 tracks). Recording positions are indicated by SPH (Search Phase) in a subcode FLE (Flag Extension), a 2-bit ternary counter. The ×24 speed search data is recorded such that data for 8 sync blocks (data Nos. 0 to 3, 8 to 11) is repeatedly recorded four times each in the recording tracks of track Nos. ETN[3:0]=11 and 15 in the ECC, and data for 4 sync blocks (data Nos. 4 to 7) is repeatedly recorded three times each in the recording track of track No. ETN[3:0]=13 in the ECC. Thus, the data for 12 sync blocks is repeatedly recorded in three ECC blocks.

These search data are utilized by being searched using the display TTC or the like in the subcodes described above in conjunction with FIG. 20.

Figure 31:
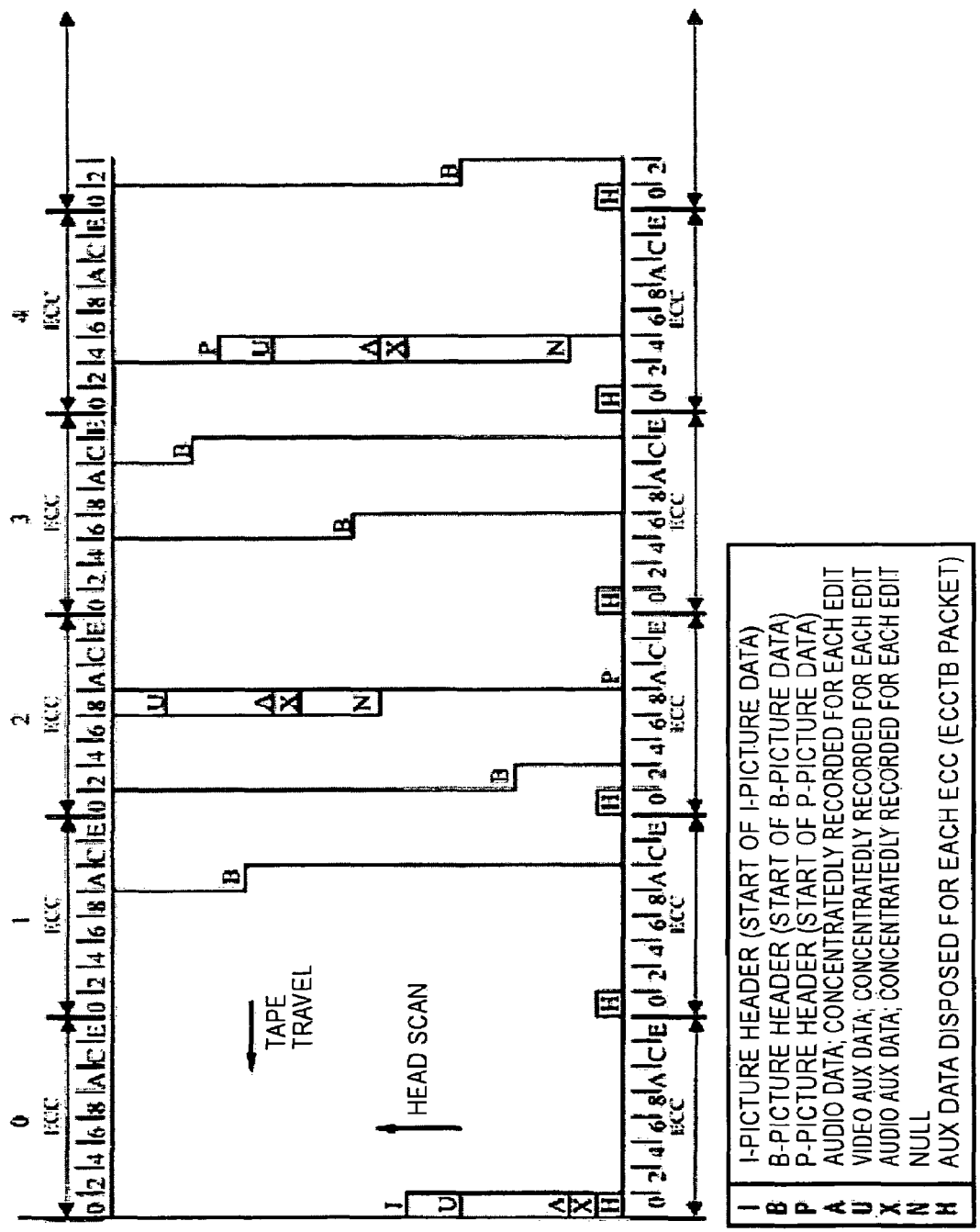
FIG. 31 is a chart showing an image of recording of the main data.

FIG. 31 is a chart showing an image of recorded main data on a magnetic tape regarding the recording in such main sectors and subcode sectors. The present embodiment is adapted to record video data and audio data compressed by an MPEG method, such as MP@HL or MP@H-14. The video data is divided into blocks by I pictures and P pictures of GOP related to the data compression, and a pack unit is formed by combining video data of each block, corresponding audio data and auxiliary data. In the example shown in FIG. 31, symbols I, P, and B denotes I pictures, P pictures, and B pictures, respectively. The first I picture is followed by pictures B, B, P, B, B, P . . . in this order in succession, the picture ratio of I, B, B, and P being 4:1:1:2. In this chart, regarding the ECC unit, which is an interleave unit, the numbers given at top and bottom indicate the numbers of ECC blocks, and the alphanumeric characters given on the inner side denote track numbers in each ECC.

In a magnetic tape, auxiliary data is recorded in terms of an ECCTB packet (denoted by a symbol H) in a first track and a first sync block of each ECC. Further, in each pack unit, after auxiliary data (denoted by a symbol X) related to audio data is recorded, the audio data (denoted by a symbol A) is recorded, and then auxiliary data (denoted by a symbol U) related to video data is recorded. Subsequently, individual pictures are recorded in the order of streaming. Incidentally, if audio data is 384 [Kbps], then the audio data is assigned 50 sync blocks on average.

Pack units in succession are recorded in succession with NULL data sync blocks and main data inserted therebetween, as necessary, to secure a proper delay time. With this arrangement, in the present embodiment, the start of each pack unit is recorded at a fixed position determined by the time management information DTS at the time of decoding.

To be more specific, in the present embodiment, the top of each pack unit is recorded by recording NULL data such that it precedes by more than the number of tracks obtained by adding a preceding amount $\alpha$ equivalent to predetermined tracks to a delay time (vbv (Video Buffering Verifier) delay) at the time of decoding in relation to corresponding time management information DTS on a magnetic tape. Further, it is set so that an ending position of each pack unit always precedes a corresponding time management information DTS on the magnetic tape. In this case, the $\alpha$ is set to 16 tracks.

Figure 32:
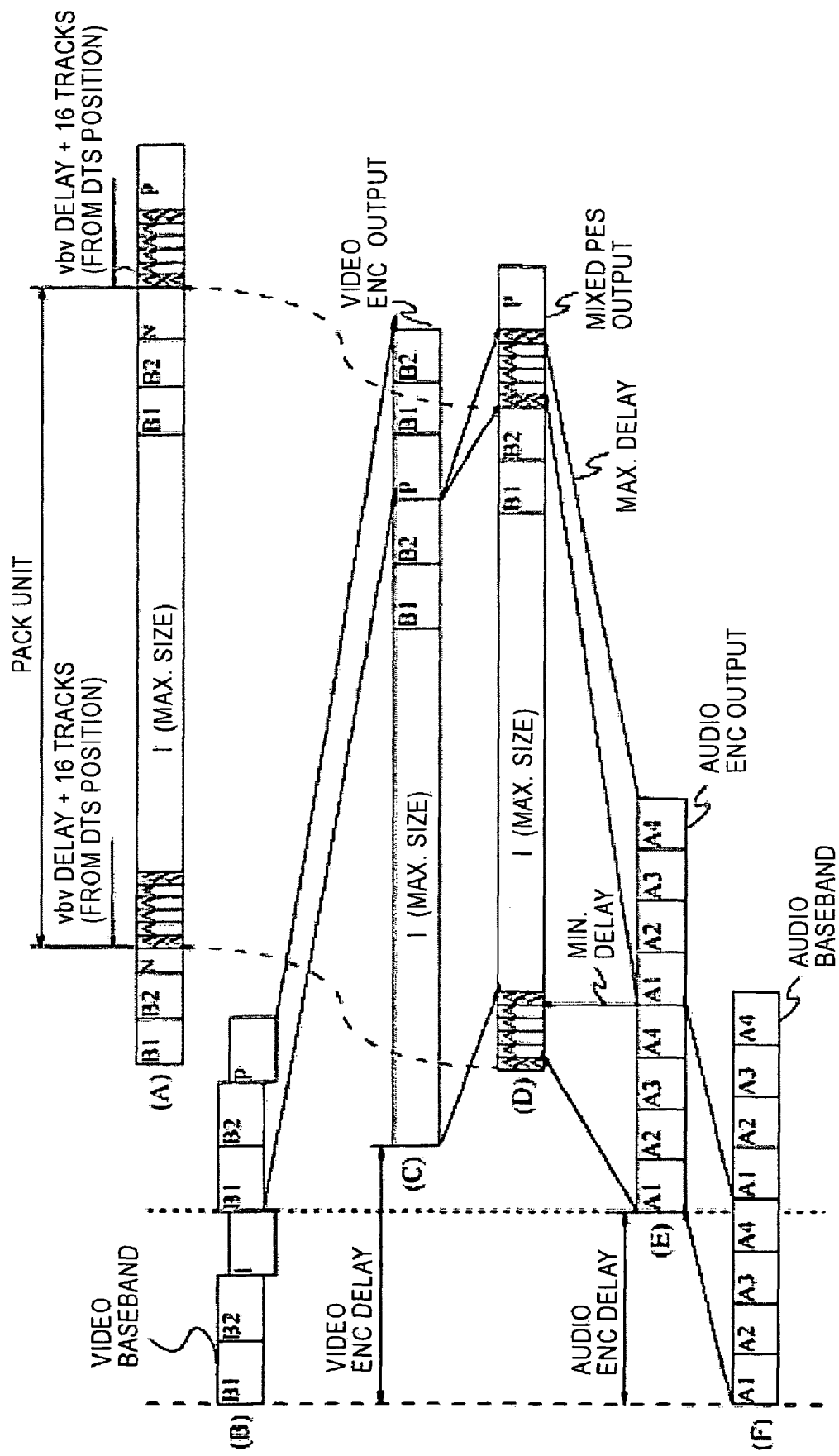
FIG. 32 is a chart provided for explaining the processing of the main data.

Specifically, as shown in FIG. 32, in the present embodiment, video data (FIG. 32(B)), which provides a base band, is compressed by the MPEG method (FIG. 32(C)), and a delay time (Video ENC delay) due to encoding of the video data occurs. This is a case where successive pictures are encoded by B, B, I, B, B, and P pictures. In relation to them, corresponding audio data A1 to A4 (FIG. 32(F)) is also subject to data compression processing (FIG. 32(E)), and a delay time (Audio ENC delay) due to the encoding of the audio data occurs. Here, each of A1 to A4 denotes a frame, which is a data compression unit of the audio data and which has a length of 24 [msec]. AXA and AXV denote auxiliary data of audio data and video data, respectively.

These compressed video data and audio data together with their corresponding auxiliary data constitute a pack unit, and the pack unit is subjected to time-division multiplexing (FIG. 32(D)) before it is recorded on a magnetic tape (FIG. 32(A)). At the time of recording to the magnetic tape, in these audio data A1 to A4, the delay time in the last audio data A4 constituting a pack unit together with an I picture will be the shortest delay time on the magnetic tape, while the delay time of the audio data A1 disposed at the head of a pack unit following the pack unit that includes the I picture will be the longest delay time on the magnetic tape. Thus, the delay time (vbv (Video Buffering Verifier) delay) at the time of decoding varies, depending on the quantity of symbols generated when data is compressed, insertion of diverse auxiliary data and search data, etc.

Figure 33:
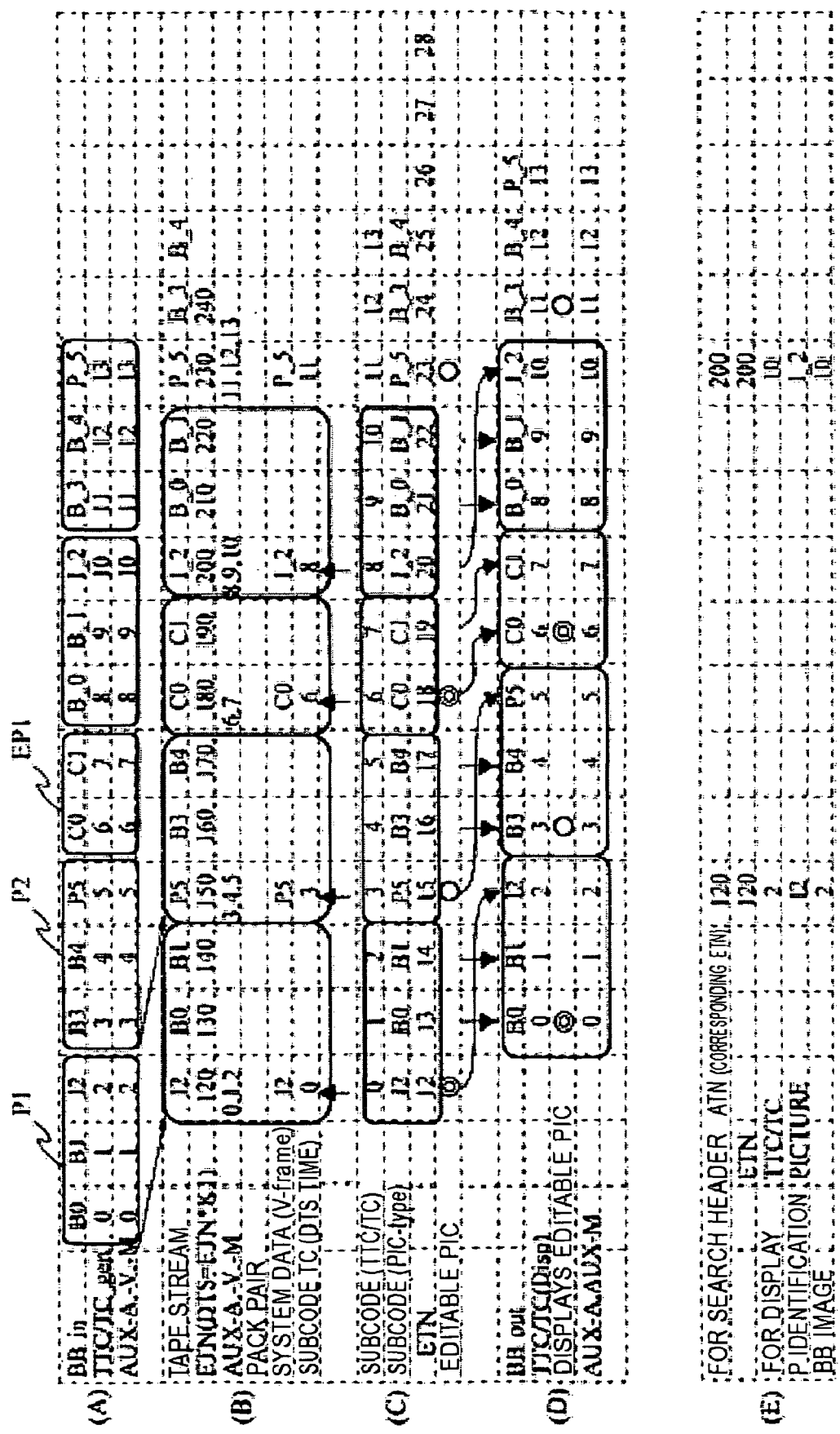
FIG. 33 is a chart showing a packing relationship in a pack unit.

FIG. 33 is a chart showing packing relationships in individual pack units. This example shows an example of recording from a first I picture in base band input video data (FIG. 33(A)). In this base band input, I, B and B pictures, and the corresponding audio data and auxiliary data make up a pack unit P1. As the auxiliary data therefor, auxiliary data AUX-A and AUX-V or the like for the audio data and the video data are obtained, and a title time code TTC or the like is generated and assigned to the auxiliary data.

Figure 34:
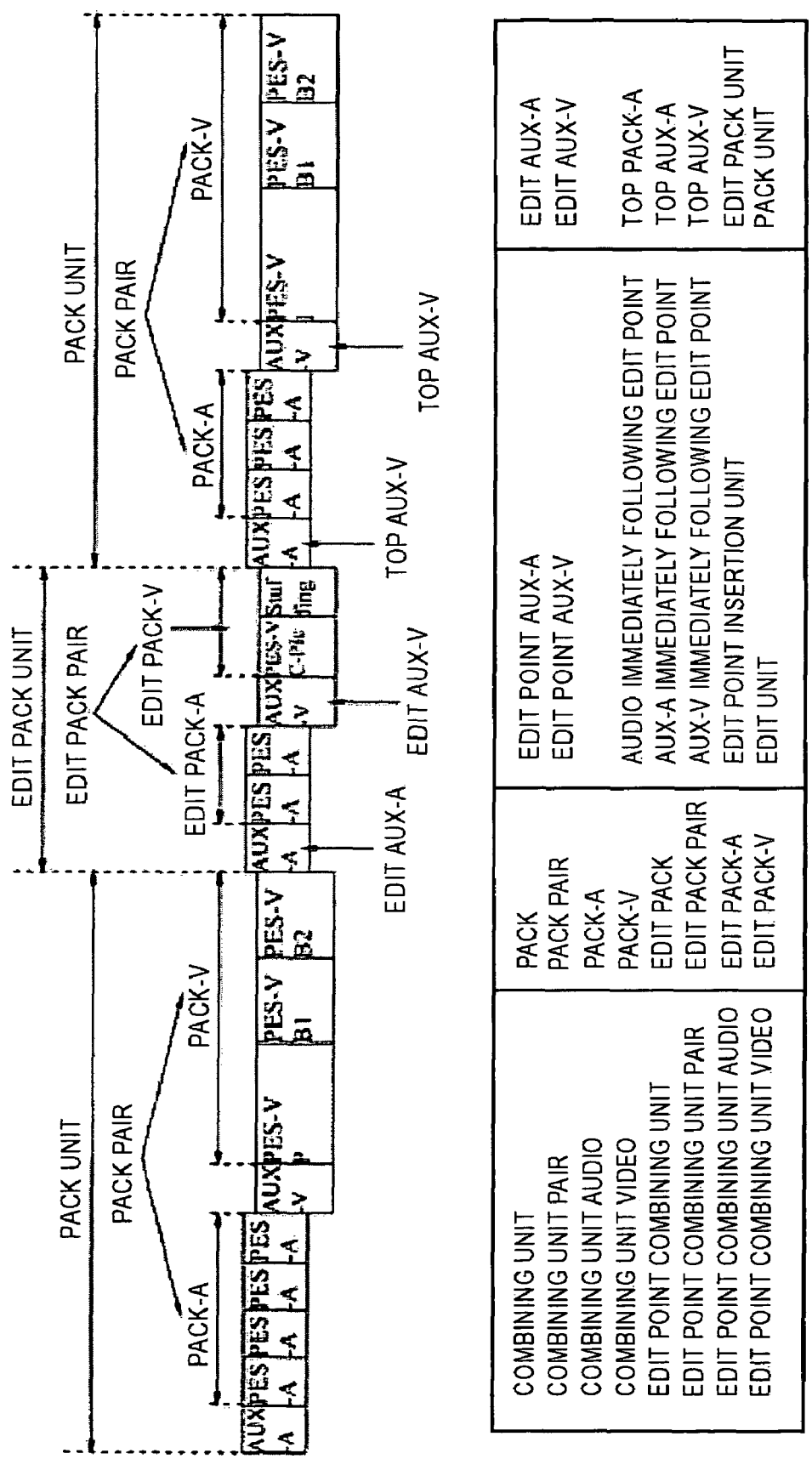
FIG. 34 is a chart showing a relationship among a series of data related to pack units.

Here, a pack unit EP1 having C0 and C1 is a pack unit EDIT PACK at an edit point, which is inserted for matching the delay time vbv delay required for edit. FIG. 34 summarizes a relationship among a series of data related to these pack units.

As indicated by arrows that illustrate association (FIG. 33(A)), in the present embodiment, a series of data related to these base band inputs is subjected to multiplexing (FIG. 33(B)), each pack unit is recorded on a magnetic tape according to main data, and corresponding auxiliary data is recorded on the magnetic tape according to subcode data (FIG. 33(C)). At this time, a stream of main data is recorded at a position preceding the time management information DTS of the subcode, and the subcode is recorded at a position based on the corresponding time management information DTS. Further, search data is recorded from an ECC bank after a corresponding I picture and corresponding time management information DTS. The order of video data is changed by reordering at encoding, whereas audio data and auxiliary data are recorded on the magnetic tape in the order in which they are input.

An extended track number ETN at the top of the I picture is set to 120. This is to put a positive value at the head of the stream, and the same applies to a track number (ATN). Incidentally, if the extended track number ETN and the track number (ATN) are started from the value 0 to start recording, then the time management information DTS on the magnetic tape based on the time obtained by adding the delay time (vbv (Video Buffering Verifier) delay) at the time of decoding and the time equivalent to an ECC block will range from 30 tracks to 110 tracks. However, in the case of self-encoding, to use the same extended track number ETN and the same track number (ATN) for a system having a field frequency of 59.94 [Hz] and a system having a field frequency of 50 [Hz], a value 120, which is the same least common multiple of the frames and tracks of these systems, is set at the first values of the extended track number ETN and the track number (ATN).

In the present embodiment, video data and audio data are reproduced and decoded on the basis of each auxiliary data of a subcode sector recorded in the magnetic tape (FIG. 33(D)). Further, search data (FIG. 33(E)) is generated from an I picture corresponding video data and recorded from a corresponding I picture and an ECC bank after corresponding time management information DTS, as described above.

Figure 35:
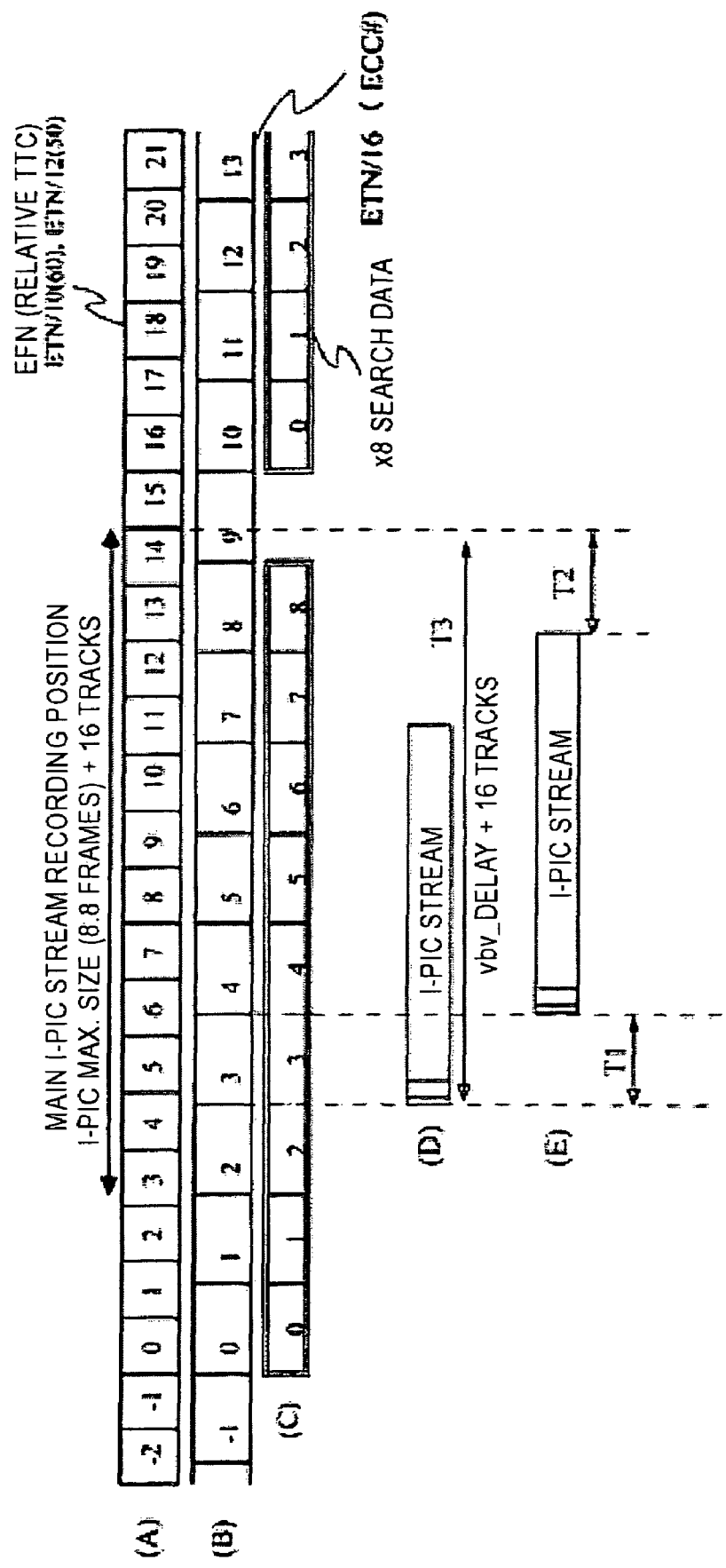
FIG. 35 is a chart showing a relationship between main data and subcode data.

Thus, on the magnetic tape, main data and subcode data are represented by the relationship shown in FIG. 35. FIG. 35 illustrates the correlation of the recording position of the beginning of a pack unit associated with a subcode by placing an emphasis on the frame at the beginning of the pack unit. Incidentally, in the case of a system having a field frequency of 59.94 [Hz], then the subcode will be constructed by 10 tracks per frame, and the subcode data of the 10 tracks in a frame will be recorded by repeating the same contents by the configuration described above in conjunction with FIG. 24.

In this case, the main data is set such that it precedes the extended track number ETN of a subcode, which is the DTS on the magnetic tape, by the time obtained by adding a delay time (vbv delay) at the time of decoding and a preceding amount equivalent to predetermined tracks and that the end of the pack unit does not go beyond the position based on the time management information DTS. However, as mentioned above, the recording start position of a pack unit may be changed, as shown in FIGS. 35(D) to (E).

Such a change T1 of the start position is made by inserting auxiliary data and search data, and can be estimated as follows. In this case, a system is conceivable in which the entire processing of a reproducing side is delayed so as to allow the data of each pack unit to be decoded after the time based on the time management information DTS. In this case, the processing would be complicated, because the reference time is merely moved backward, and an extra delay would be necessary also for the data to be recorded in a subcode.

Among the factors contributing to the change T1 in the start position mentioned above, a change based on density of search data is maximum 1.6 tracks for both ×8 speed and ×24 speed, and the data volume of corresponding audio data is maximum 0.7 track. In auxiliary data, the change is 3 tracks per 3 frames. In NULL data, the change is maximum 1.0 track when the recording start position of a pack unit is decremented in units of tracks. Totaling these amounts to 6.3 tracks.

Accordingly, in the present embodiment, the preceding amount α equivalent to the predetermined tracks is set to 6.3 tracks or more, thereby allowing a video stream and an audio stream to be uninterruptedly reproduced. A format rule specifies the preceding amount α to 16 tracks, further considering extendability.

More specifically, if the preceding amount α is set to 9 to 12 tracks, which is 6.3 tracks or more, then the extra margin makes it possible to record all auxiliary data (AUX-M) together. Incidentally, it will be possible to intermittently record data of about 100 [KB], which is equivalent to 10 tracks. Moreover, search data for 4-fold speed, 16-fold speed, etc. can be additionally recorded in addition to the search data for the ×8 speed and the ×24 speed. Incidentally, additionally recording such search data as mentioned above will lead to a lower rate accordingly in video data. In a system wherein a memory for processing is also used for recording/reproduction, an allowance for a few frames is produced during reproduction, thus making it possible to use the allowance for various types of processing. Specifically, preceding up to 4 tracks on the recording side enables the reproducing side to secure a memory capacity for 16 tracks so as to accommodate the extended formats described above. In this case, the memory can be saved for about one frame, as compared with a system constructed differently.

FIGS. 35(A), (B) and (C) show main data, subcode data, and search data, respectively, and (D) and (E) illustrate examples of most preceding recording and most delayed recording. FIG. 35 shows a number of tracks with delay time (vbv delay), 300 tracks per second. Thus, in the present embodiment, an allowance of a period T2 is provided at the end of a pack unit and the end of an I picture before a corresponding DTS position is reached.

Figure 36:
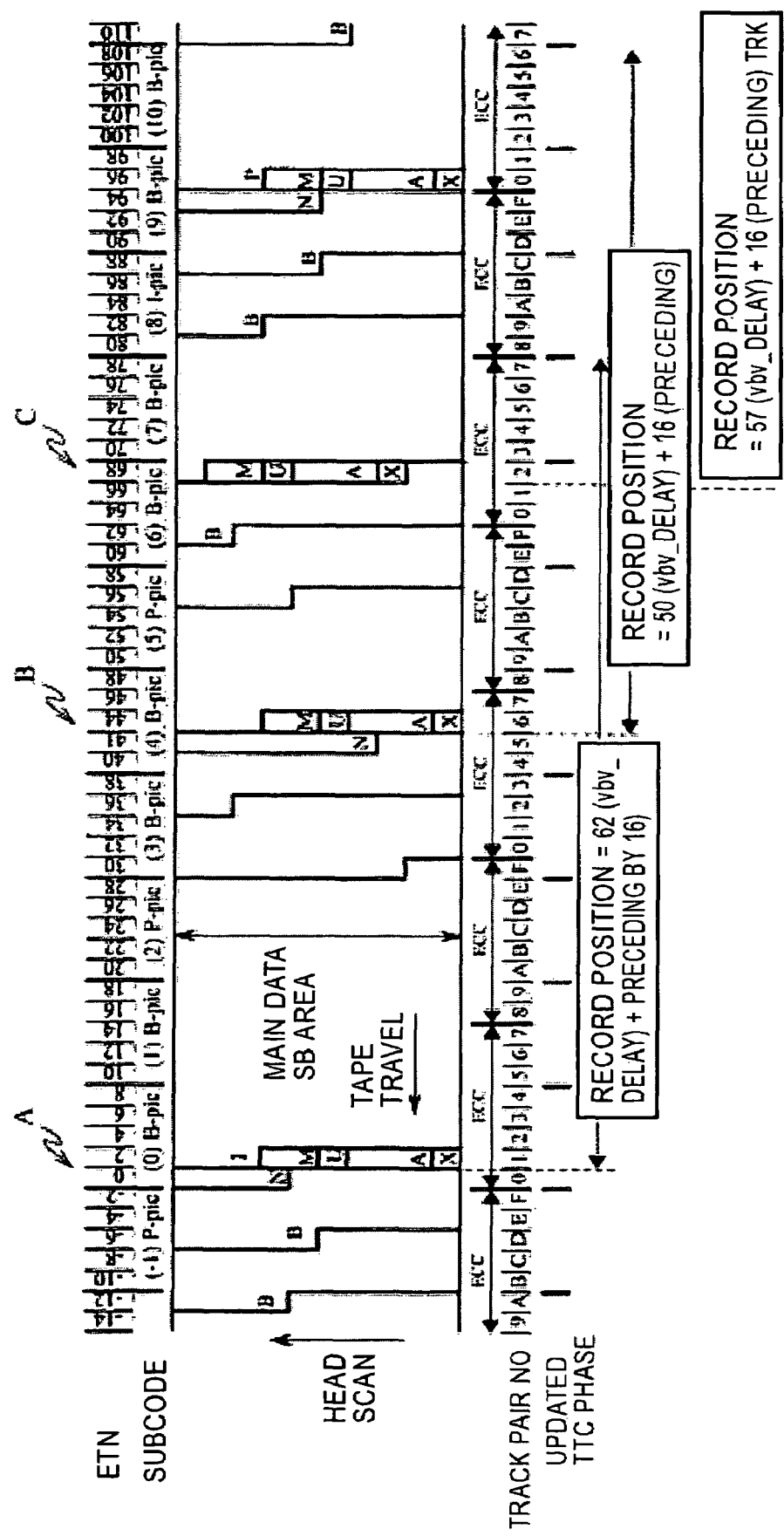
FIG. 36 is a chart provided for explanation of recording of a pack unit.

In the processing for setting of the beginning of a pack unit, as indicated by a symbol A in FIG. 36 in contrast to FIG. 31, if the delay time (vbv delay) at the time of decoding is 62.7 tracks in terms of the number of tracks, and the number of tracks 16 of an interleave is added to the 62 tracks obtained by discarding all digits to the right of the decimal point of 62.7, then 78 tracks are obtained. Based on this, if the extended track number ETN, which indicates a position on a magnetic tape based on the time management information DTS, is a value 80, then NULL data is assigned such that a corresponding pack unit is recorded from the position where the extended track number ETN is a value 2, which is the position preceding by 78 tracks from the above extended track number ETN. FIG. 36 illustrates a case where the number of tracks corresponding to the period of one frame is 10, a description of an ECCTB packet being omitted.

At the beginning of a pack unit represented by a symbol B, the delay time (vbv delay) at the time of decoding is 50.4 tracks in terms of the number of tracks. In this case, a value 66 is obtained for the number of tracks provided in the same manner. In terms of the number of tracks, a change equivalent to 30 tracks takes place from the case indicated by the symbol A, causing ETN to be 110. Accordingly, NULL data is assigned such that a corresponding pack unit is recorded from a position specified by ETN=44 obtained by subtracting the value 66 from ETN=110.

At the beginning of a pack unit represented by a symbol C, the delay time (vbv delay) at the time of decoding is 57 tracks in terms of the number of tracks. In this case, a value 73 is obtained for the number of tracks provided in the same manner, and ETN is 140. Hence, subtracting the value 73 from ETN=140 provides ETN=67. In this case, ETN=68 is obtained without inserting any NULL data and a recording start position is passed. Therefore, a pack unit is recorded without assigning any NULL data in this case.

Successive pack units delay from the most preceding recording start position until NULL is no longer required to be inserted, because the quantity of symbols generated when data is compressed in the three pictures constituting a pack unit is small, and if a plurality of factors is combined, such as a large AUX data volume of the pack unit, insertion of NULL data, which causes a delay (maximum one track), and search data being recorded meanwhile.

(1-2) Video Tape Recorder

Figure 37:
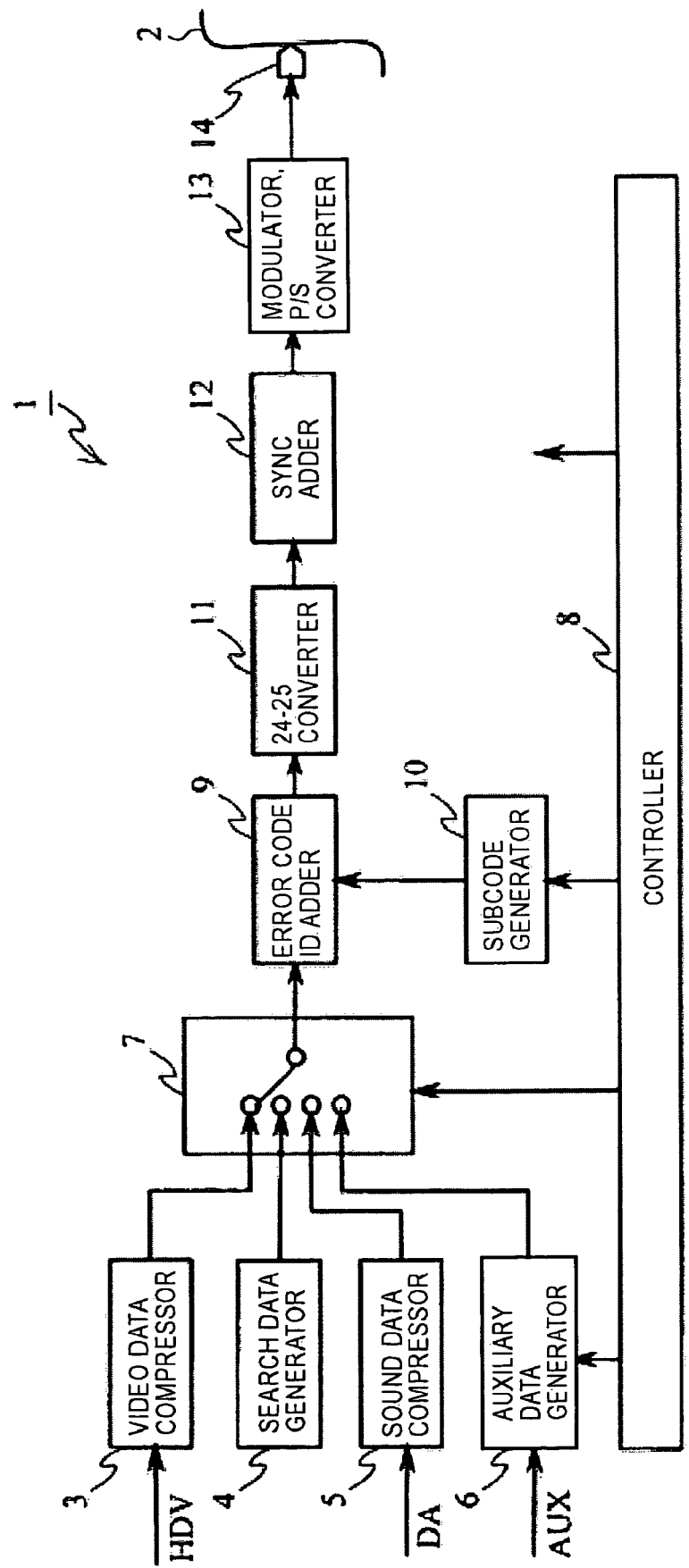
FIG. 37 is a block diagram showing a construction of a recording system.
Figure 38:
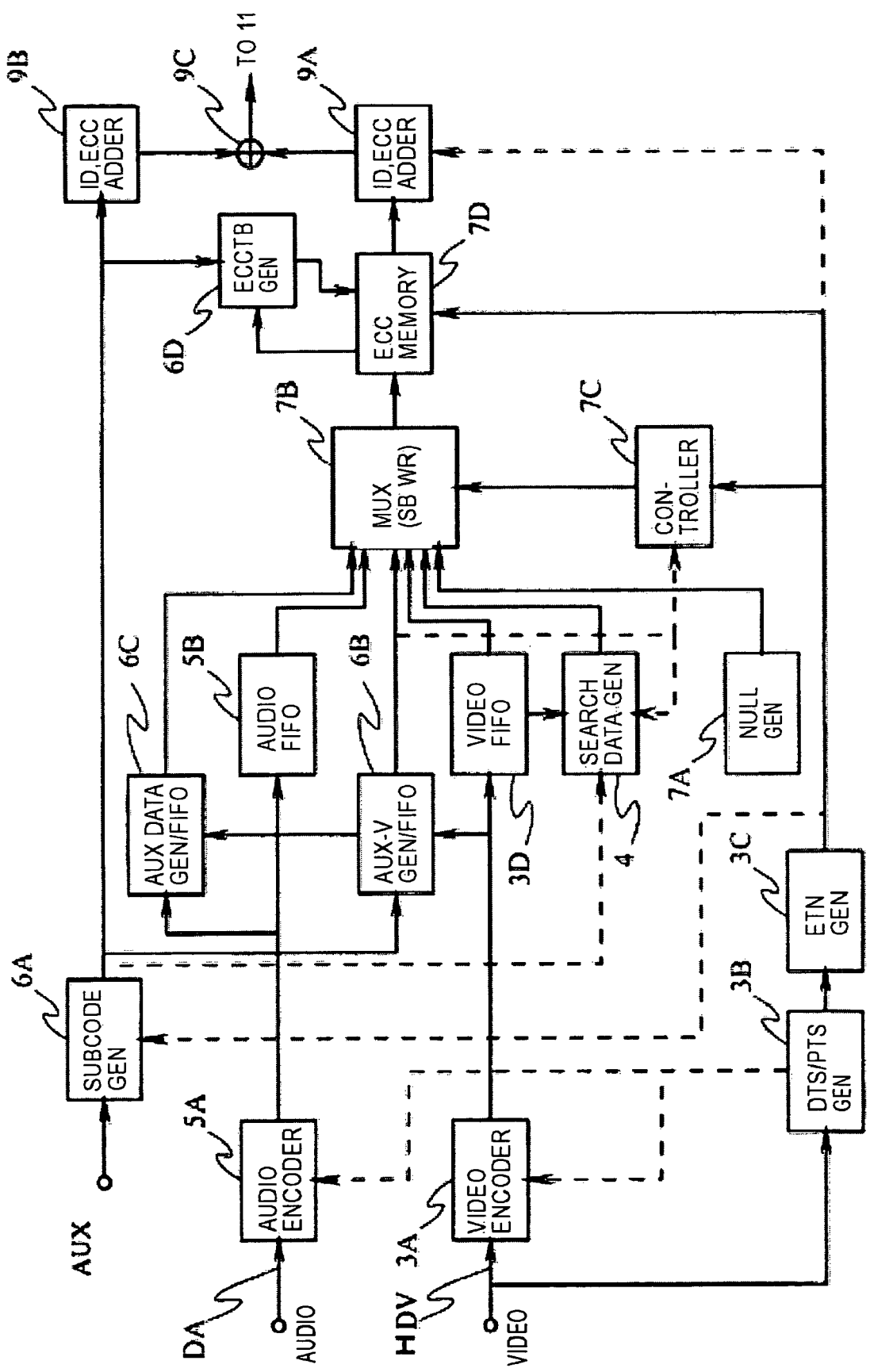
FIG. 38 is a chart showing details of a part of the recording system shown in FIG. 37.

FIG. 37 is a block diagram showing a recording system of a video tape recorder according to an embodiment of the present invention. FIG. 38 is a block diagram showing in detail a part of the recording system. This video tape recorder 1 compresses video data and audio data according to the format described above in conjunction with FIG. 1 to FIG. 36 by the MPEG method, MP@HL, MP@14, etc. to record them to a magnetic tape 2, and reproduces and decodes them.

More specifically, in the video tape recorder 1, a video data compressor 3 compresses sequentially input video data HDV according to a method that complies with MPEG2 (MP@HL, MP@14) under rate control by a controller 8, and outputs the compressed video data together with diverse time information, etc. More specifically, the video data compressor 3 is constructed of a video encoder 3A, a DTS/PTS generator (DTS/PTS GEN) 3B, an ETN generator (ETNGEN) 3C, and a video FIFO3D (FIG. 38). Of these, the video encoder 3A compresses the video data HDV and outputs the video data of PES signals to which a header time stamp, etc. have been added. The DTS/PTS generator 3B detects time information from the video data HDV and outputs time management information DTS and PTS on the basis of the time information. The ETN generator 3C calculates the extended track number ETN from the processing result supplied by the DTS/PTS generator 3B according to the aforementioned relational expression, and outputs the calculation result. The video FIFO3D temporarily holds the video data output from the video encoder 3A, and then outputs the video data. In the present embodiment, 15 pictures constitute 1 GOP, and P pictures are set for every 3 pictures from the first I picture of the GOP. B pictures are set for other pictures of the GOP.

A search data generator 4 selects an I picture from the video data as described above, and then selects data of low-frequency components from encoded data based on the I picture, thereby generating and outputting search data.

A sound data compressor 5 receives audio data DA associated with the video data HDV, compresses the audio data DA according to a method complying with MPEG Layer 2, and then outputs the compressed data at a rate of 256 to 384 [Kbps]. Specifically, in the sound data compressor 5, the audio encoder 5A compresses and outputs the audio data DA, and the audio FIFO5B temporarily retains and then outputs the output data of the audio encoder 5A.

An auxiliary data generator 6 generates and outputs auxiliary data. More specifically, the auxiliary data generator 6 is constructed of a subcode generating circuit 6A, a video auxiliary data generating circuit 6B, and an audio auxiliary data generating circuit 6C. Of these, the subcode generating circuit 6A generates and outputs corresponding auxiliary data from the diverse information input together with the video data HDV and the audio data DA. The video auxiliary data generating circuit 6B and the audio auxiliary data generating circuit 6C generate auxiliary data for the compressed video data and audio data output from the video encoder 3A and the audio encoder 5A, respectively, and output the generated auxiliary data. Further, an ECCTB generator (ECCTB GEN) 6D generates and outputs auxiliary data required for an ECCTB packet.

A multiplexing circuit 7 multiplexes these compressed video data, audio data, search data, and auxiliary data together with NULL data, and outputs them. More specifically, in the multiplexing circuit 7, a NULL generator (NULL GEN) 7A generates and outputs NULL data having, for example, all bits set to predetermined logical values, and a multiplexer (MUX) 7B sequentially multiplexes and outputs the NULL data, the video data and the audio data output from the FIFO 5B and 6B, the search data output from the search data generator 4 and the auxiliary data generating circuit 6C, and auxiliary data under the control by a controller 7C. Thus, this video tape recorder 1 generates strings of data constituting sync blocks.

In this processing, the controller 7C calculates data volumes of auxiliary data, search data, etc. of each pack unit, and controls the operation of the multiplexer 7B to insert NULL data on the basis of the delay time (vbv delay) at the time of decoding discussed above. An ECC memory 7D temporarily holds output data of the multiplexer 7B for each ECC block and outputs it in a predetermined order. Thus, the ECC memory 7D carries out interleave processing. In such processing, output data of the ECCTB generator 6D and output data of the ETN generator 3C, etc. are inserted and output at timings for disposing the ECCTB packets and subcode sectors.

A subcode generator 10 generates and outputs a string of data of a subcode in a subcode sector. An error code ID adder 9 adds an error correction code, an ID, etc. to output data of the multiplexing circuit 7 and output data of the subcode generator 10 so as to generate strings of data of a main sector and a subcode sector. More specifically, the subcode generator 10 is constructed of the aforesaid ETN generator 3C, the subcode generating circuit 6A, etc. In the error code ID adder 9, an ID, ECC adding circuit 9A adds an ID and an error correction code to output data of the ECC memory 7D and outputs the result. An ID, ECC adding circuit 9B adds an ID and an error correction code to output data of the subcode generating circuit 6A and outputs the result. An adding circuit 9C gathers all output data of these ID, ECC adding circuits 9A and 9B into a single system and outputs the system to a subsequent 24-25 converter 11.

The 24-25 converter 11 carries out 24-25 modulation on output data of the error correction code ID adder 9, and outputs the result. A sync adding circuit 12 adds sync to output data of the 24-25 converter 11, and outputs the results. A modulator, P/S converter 13 modulates output data NRZI (Non Return to Zero Inverted) of the sync adding circuit 12 and then converts it into a string of serial data. A magnetic head 14 mounted on a rotating drum is driven according to the string of serial data. A controller 8 is a controller for controlling the operation of each circuit block. With these arrangements, the video tape recorder 1 sequentially records video data, audio data, etc. to the magnetic tape 2 according to the aforementioned formats.

Figure 39:
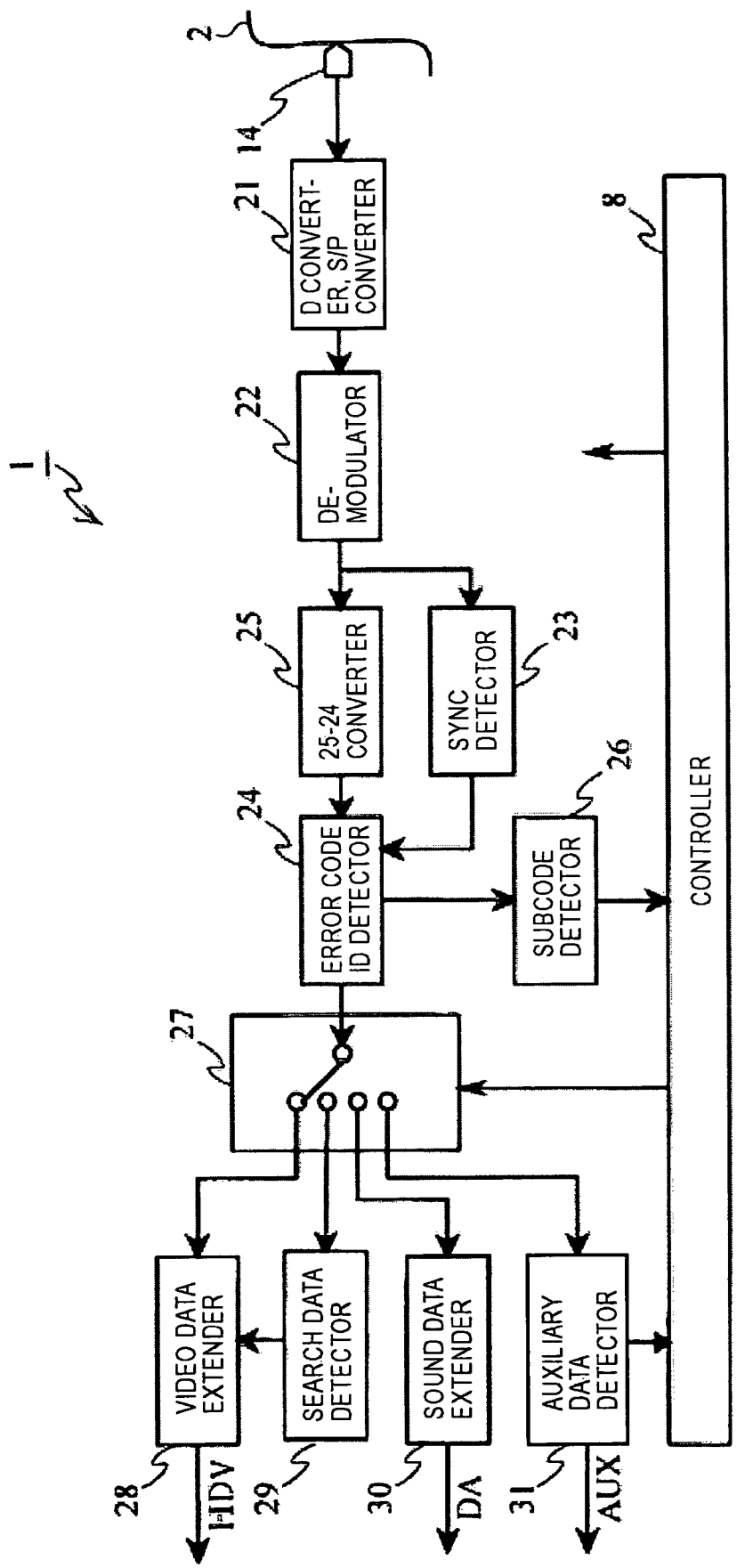
FIG. 39 is a block diagram showing a construction of a reproducing system.
Figure 40:
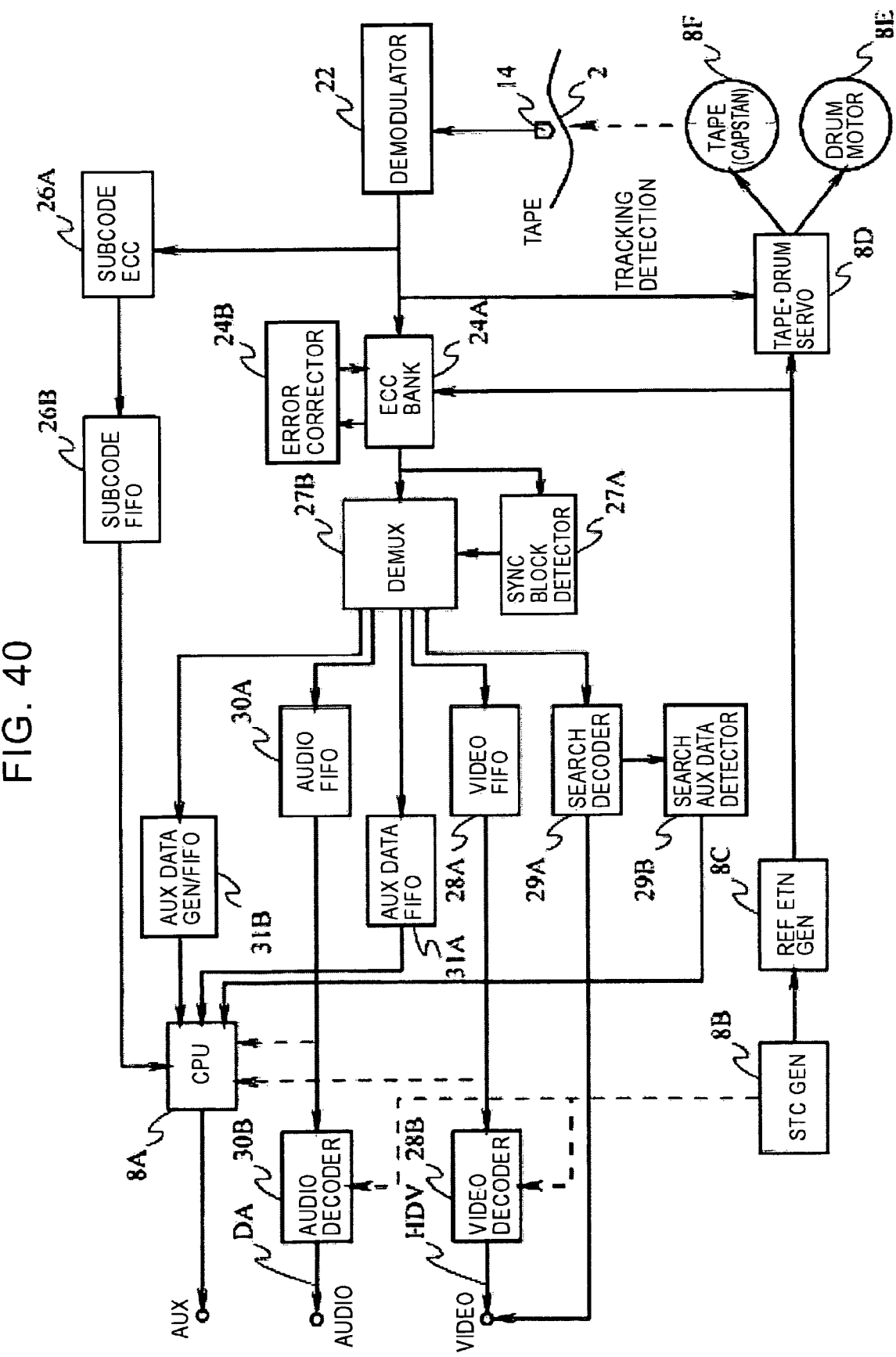
FIG. 40 is a chart showing details of a part of the reproducing system shown in FIG. 39.

FIG. 39 is a block diagram showing a reproducing system of the video tape recorder 1, and FIG. 40 is a block diagram showing a part of the reproducing system in detail. In this reproducing system, a digital converter, S/P converter 21 amplifies an output signal of the magnetic head 14 by an amplifier circuit, which is not shown, then subjects the amplified signal to analog-to-digital conversion processing to perform, for example, Viterbi decoding, thereby to reproduce input data of a modulator, P/S converter 13 in the recording system. The digital converter, S/P converter 21 converts the reproduced data into parallel data and outputs the parallel data.

A demodulator 22 demodulates output data of the digital converter, S/P converter 21 by carrying out processing that corresponds to NRZI modulation at recording, and outputs the result. A sync detector 23 detects a sync of each sync block from the output data of the demodulator 22, and notifies an error correction ID detector 24 or the like of a timing of the sync detection. A 25-24 converter 25 subjects output data of the digital converter, S/P converter 21 to 25-24 conversion processing thereby to reproduce and output input data of the 24-25 converter 11 in the recording system.

The error correction ID detector 24 pastes the data following an ID of output data of the 24-25 converter 11 to an ECC bank 24A according to an SB number and a track number detected from the ID on the basis of a sync detection timing supplied by the sync detector 23, and an error corrector 24B performs error correction processing and de-interleave processing and outputs the result. Specifically, the ECC bank 24A has three banks, namely, a bank for writing input data, a bank for performing the ECC processing by 24B, and a bank for outputting a result to a separating circuit 27.

A subcode detector 26 SB-detects a subcode from a subcode sync, corrects an error, and outputs it. Specifically, in the subcode detector 26, a subcode ECC 26A selectively acquire data of a subcode sector from output data of the 24-25 converter 11 and performs error correction processing so as to acquire and output subcode data. A subcode FIFO 26B outputs data of the subcode to a central processing unit (CPU) 8A, which is a controller 8.

The separating circuit 27 separates output data of the error correction ID detector 24 into individual processing systems according to an SB header. More specifically, in the separating circuit 27, an SB detecting circuit 27A detects each SB to detect main data of each sync block, and a demultiplexer 27B outputs the output data of the error correction ID detector 24 to each processing system on the basis of detection results of the SB detecting circuit 27A.

A video data extender 28 receives video data from the separating circuit 27, and extends the video data and outputs it, which is opposite from recording. More specifically, in the video data extender 28, a video FIFO 28A temporarily holds output data of the separating circuit 27 before outputting it, and a video decoder 28B extends output data of the video FIFO 28A and outputs the extended data. This enables the video tape recorder 1 to output video data HDV, which is a reproduced result.

According to the present embodiment, the video FIFO 28A that temporarily retains the video data before outputs it is set such that the recording position of the start of each pack unit provides a capacity more than the capacity corresponding to a preceding amount that precedes a position where corresponding reproduction standard management information has been recorded in the recording system.

A search data detector 29 receives search data from the separating circuit 27, generates video data from the search data, and then outputs the generated video data. More specifically, in the search data detector 29, a search decoder 29A receives search data from the separating circuit 27. Interpolation processing is carried out for a part that has not been acquired, then video data is generated and the generated video data is output. A search auxiliary data detecting circuit 29B acquires auxiliary data added to the search data and notifies the central processing unit BA.

A sound data extender 30 receives audio data from the separating circuit 27 and extends the audio data, then outputs the extended audio data. More specifically, in the sound data extender 30, an audio FIFO 30A temporarily holds audio data output from the separating circuit 27 and then outputs it. An audio decoder 30B extends the audio data and then outputs the extended audio data. This arrangement enables the video tape recorder 1 to output audio data DA, which is a reproduced result.

An auxiliary data detector 31 detects auxiliary data from the separating circuit 27 and outputs it to the controller 8. More specifically, in the auxiliary data detector 31, an auxiliary data FIFO 31A temporarily retains auxiliary data output from the separating circuit 27 and then outputs it to a central processing unit 8A. An auxiliary data generator FIFO 31B temporarily retains auxiliary data output from the separating circuit 27 and converts it into a format compatible with output of video data, audio data, etc., then outputs it to the central processing unit 8A.

The controller 8 controls these circuit blocks also for the reproducing system to perform the aforementioned operations, as in the case of the recording system. More specifically, in the controller 8, the central processing unit 8A implements a processing procedure recorded in a memory, not shown, to control all these operations. In this processing, a system time clock STC generator 8B generates and outputs a system time clock STC, which provides an operational reference for the video tape recorder 1, and a reference ETN generator 8C generates a comparison reference ETN from the system time clock STC and outputs the generated ETN. A tape drum servo circuit 8D rotatively drives a capstan motor 8F and a drum motor 8E to feed the magnetic tape 2 at a predetermined speed and also rotatively drives a rotating drum, around which the magnetic tape 2 is wound, at a predetermined speed. In this processing, a tape drum servo circuit 8D compares the comparison reference ETN obtained from the reference ETN generator 8C with an ETN (the ETN obtained from the subcode detector 26) based on a reproduced result obtained from output data of the demodulator 22, and controls a rotational phase of the capstan motor 8F so that they coincide with each other. With this arrangement, in the video tape recorder 1, the magnetic tape 2 can be scanned by the magnetic head 14 by the same track tracing as that for recording.

(1-3) Relationship between Main Data and Auxiliary Data

To record various main data and associated subcode data to the magnetic tape 2 in sequence, the video tape recorder 1 configures a main sector such that each pack unit includes complete video data HDV, audio data DA and associated auxiliary data, and disposes auxiliary data of the audio data DA, the audio data DA, and auxiliary data of the video data HDV all together in sequence at the beginning of each pack unit, as discussed above. This enables the video tape recorder 1 to easily detect auxiliary data at reproducing, and also to perform interpolation arithmetic processing on various types of time information or the like for one pack unit by using only auxiliary data recorded at the beginning of each pack unit.

In the auxiliary data of a main sector recorded as described above, the reproduction standard management information ETN corresponding to the time management information DTS of video data at the time of decoding (FIG. 14, FIG. 15, and FIG. 33) is disposed in the order of pictures of the video data HDV, which is a base band. Similarly, TTC and REC TIME (FIG. 14, FIG. 15, and FIG. 33), which is time information, are also disposed in the order of pictures of the video data HDV. In auxiliary data of a subcode sector, ETN, which is reproduction standard management information, and picture type information, are disposed in the order of pictures of video data that has been compressed. The time information TTC and REC TIME, which is auxiliary data of a similar subcode sector, is recorded in the same order as that of the main sector, thus permitting a correlation with corresponding auxiliary data of the main sector to be established.

With this arrangement, the video tape recorder 1 selectively acquires auxiliary data sequentially reproduced from a main sector and subcode sector at the time of reproduction to use it for processing, such as decoding and outputting of video data HDV.

Auxiliary data related to search data (FIG. 20) is recorded on the basis of the time management information DTS of video data at the time of decoding in the case of search data of video data recorded in a magnetic tape, while it is recorded on the basis of the time management information PTS of reproduced outputs of video data HDV in the case of display data displayed together with search data images.

In other words, among such auxiliary data, for search data, the video tape recorder 1 generates the tape position information ATN indicating the position where corresponding video data has been recorded and the reproduction reference management information ETN of corresponding video data according to the time management information DTS standard. Display data, TTC, REC TIME, etc. are generated on the basis of the time management information PTS of reproduced outputs. Furthermore, when outputting video data of search data, the video tape recorder 1 processes video data and outputs it so as to display diverse information based on the display data on a screen according to user's instructions.

Thus, in the present embodiment, the video encoder 3A and the audio encoder 5A make up a data compressing means for compressing video data and audio data to generated compressed video data and compressed audio data, while the multiplexer 7B constitutes a pack unit generating means for forming compressed video data into a block in units of a predetermined number of pictures, and then generating a pack unit that combines compressed video data of the block, corresponding compressed audio data, and corresponding auxiliary data. In a circuit block following the multiplexer 7B constitutes a recording system that assigns data of a pack unit to a main sector, and assigns auxiliary data of the pack unit to a subcode sector thereby to sequentially form a recording track having the main sector and the subcode sector.

The search data generator 4 constitutes a search data generating means for generating search data from picture data obtained by encoding in a frame in video data, and to constitute, together with the ETN generator 3C or the like, an auxiliary data generating means for generating search auxiliary data related to search data.

(2) Operation of the Embodiment

In the video tape recorder 1 having the construction described above (FIG. 37 and FIG. 38), in a recording mode, video data HDV and audio data DA are compressed according to the MPEG method by a video encoder 3A constituting the video data compressor 3 and the audio encoder 5A constituting the sound data compressor 5 to generate video data and audio data of a PES transport stream. A search generator 4 serving as the search data generator 4 selects data of low-frequency components from data of an I picture of the compressed video data to generate ×8 speed and ×24 speed search data. Further, auxiliary data for generating a subcode is prepared by the auxiliary data generator 6 from information on pictures of video data and auxiliary data or the like input together with the video data.

When preparing the auxiliary data, the DTS/PTS generator 3B of the video tape recorder 1 generates the time management information DTS of a frequency of 90 [kHz], which is the reference for outputting video data HDV. Based on the time management information DTS, the extended track number ETN, which is the reproduction reference time information for reproducing compressed video data recorded on the magnetic tape 2 by arithmetic processing of ETN=DTS/300.3 if the video data HDV has a field frequency of 59.94 [Hz], or by arithmetic processing of ETN=DTS/360 if the video data HDV has a field frequency of 50 [Hz].

In the video tape recorder 1, these compressed video data and audio data, auxiliary data, and search data are subjected to time-division multiplexing by the multiplexer 7B, and the result is retained in the ECC memory 7D. These data are output from the ECC memory 7D in a predetermined order, and these data are allocated to main data of a main sector and a subcode sector and then subjected to interleave processing. Subsequently, an ID and error correction codes C1 and C2 are added to these output data of the ECC memory 7D and then subjected to 24-25 conversion by the 24-25 converter 11. Thereafter, a sync is added to the converted data by the sync adding circuit 12. Thus, the video data, the audio data, a part of the auxiliary data, and the search data are converted into a string of data based on the main sector structure (FIG. 4). The auxiliary data is converted into a string of data based on a similar subcode sector structure (FIG. 21). Furthermore, the string of data having the main sector structure and the string of data having the subcode sector structure are subjected to NRZI modulation by the converter 13 into a serial data string, which is recorded on the magnetic tape 2. At this time, in the video tape recorder 1, postamble, preamble, or the like is added in the middle to these strings of data, and the strings of data are sequentially recorded aslant on the magnetic tape 2 in the format shown in FIG. 2. In the processing, the ECC memory 7D is controlled so that the processing for error correction codes and interleave is carried out on a 16-track basis on the magnetic tape 2, and the error correction codes are generated. Thus, in the video tape recorder 1, DTS, STP, ETN, etc. are allocated to a subcode, and corresponding video data and audio data are recorded on the magnetic tape 2.

In the video tape recorder 1, the video data to be recorded on the magnetic tape 2 is compressed using a 15-picture GOP, and the video data making up one GOP containing 15 pictures is divided by every 3 pictures to generate pack data of video data (PACK-V shown in FIG. 34). The video tape recorder 1 forms a pack unit by the pack data of the video data, the corresponding audio data, and auxiliary data, and records the video data, the audio data, and the auxiliary data on the magnetic tape 2 on the basis of the pack unit (FIG. 31). In each pack unit, auxiliary data related to audio data, the audio data, and auxiliary data related to video data are placed together in order at the head of the pack unit and recorded on the magnetic tape 2 in order. This enables the video tape recorder 1 to process video data or the like recorded on the magnetic tape 2 on the pack unit basis.

In the video tape recorder 1, in addition to the recording based on such pack units, an ECCTB packet of auxiliary data is allocated to the top sync block of the top track of each interleave. Moreover, ×8-speed and ×24-speed search data are recorded at predetermined positions to improve processing, such as searching.

In the video tape recorder 1, to record video data, audio data, and auxiliary data in units of packets, a main sector in each pack unit is configured so that video data, audio data, and corresponding auxiliary data are completely included in the pack unit, and the auxiliary data of the audio data, the audio data, and the auxiliary data of the video data are sequentially disposed together at the top of each pack unit. This arrangement enables the video tape recorder 1 to easily detect auxiliary data at the time of reproduction, and also to perform interpolation arithmetic processing on various types of time information or the like for one pack unit by using only auxiliary data recorded at the beginning of each pack unit.

In other words, if corresponding data were not complete for each pack unit, then it would be difficult to identify the correspondence relationship among these data on a magnetic tape when the amounts of generated codes of video data widely change. Especially if, for example, the interpolation arithmetic processing were to carried out when it is impossible to reproduce desired auxiliary data, then the auxiliary data of successive pack units would be required after all. However, as in the present embodiment, the interpolation arithmetic processing for auxiliary data in a pack unit can be effectively carried out by providing one complete pack unit and disposing auxiliary data at the top of the pack unit. This permits simplified processing to be achieved. Moreover, when performing splice recording, the corresponding auxiliary data of recorded data can be easily referred to. Such a reference can be easily detected due to the pack unit arrangement.

Furthermore, to rewrite data in an edit mode or to record data right next to the previously recorded data, it would not be required to refer to data before an edit point, as necessary, allowing the processing and the configuration to be simplified accordingly. In addition, video data and audio data themselves can be subjected to interpolation arithmetic processing within a pack unit, also contributing simplified processing.

In the video tape recorder 1, regarding the auxiliary data recorded as described above, the reproduction reference management information ETN corresponding to the time management information DTS of video data in a decoding mode and the time information TTC and REC TIME are disposed in the order of pictures of video data HDV in a main sector. Regarding the auxiliary data in a subcode sector, the ETN, which is the reproduction reference management information and picture-type information are disposed in the order of pictures of compressed video data, and the time information TTC and REC TIME are recorded in the same order as that in the main sector.

With this arrangement, in the video tape recorder 1, auxiliary data required for each processing, such as decoding in the reproducing mode, is recorded by being disposed at corresponding positions in the recording mode. This makes it possible to reproduce and decode video data and audio data by processing pictures and audio data according to the merely reproduced corresponding auxiliary data at the time of reproduction, permitting the processing and construction of the reproducing side to be simplified. Thus, the entire system can be efficiently configured.

Furthermore, disposing the auxiliary data as described above allows the correlation between a subcode and a stream to be easily identified, permitting the entire construction to be simplified accordingly. More specifically, the time management information DTS of the top video data of a pack unit has a proportional relationship with the management information ETN of the corresponding subcode. This arrangement clarifies the correspondence relationship and also clarifies reference standards.

Regarding the auxiliary data for search data, the tape position information ATN, which is search data, and the reproduction reference management information ETN are recorded according to the time management information DTS standard on the basis of the time management information DTS of video data in the decoding mode, while TTC, REC TIME, and the like, which are search data, are recorded according to the time management information PTS standard on the basis of the time management information PTS of reproduced outputs of the video data HDV.

Thus, according to the video tape recorder 1, search data is recorded also according to the standards for processing at the time of reproduction, as discussed above. This arrangement allows a desired scene to be easily selected by time series simply by sequentially showing display data sequentially produced at the time of reproduction. The scene can be detected in this manner and can be easily accessed by corresponding search data. This arrangement makes it possible to simplify the construction of the reproducing side, permitting the entire system to be efficiently configured.

Incidentally, if these pieces of information were to be recorded using only, for example, the PTS standard, without switching between such standards, then complicated processing would be required in an encoder when generating search images. The auxiliary data in an I-picture pack unit could be directly allocated as it is. This, however, would require an image formed by search data and corresponding time information TTC, REC TIME/DATE be corrected for reordering, requiring complicated arithmetic processing in some cases. Incidentally, handling a carry or a drop frame requires complicated arithmetic processing.

The present embodiment, however, obviates the need for carrying out processing, such as the aforementioned correction, so that the processing of the reproducing side can be simplified. This arrangement allows a desired scene to be easily accessed by search data.

(3) Advantages of the Embodiment

According to the construction described above, at least the reproduction reference management information is recorded in the order of pictures of video data to be reproduced and output in a main sector, or in the order of pictures of compressed video data in a subcode sector, thus permitting the entire system to be efficiently configured.

Furthermore, search data is recorded on the basis of the time management information of video data in the decoding mode, and display data is recorded on the basis of the time management information of reproduction and output of video data, thus allowing the entire system to be efficiently configured.

(4) Other Embodiments

In the aforementioned embodiment, the description has been given of the case where mainstream data is delayed by recording NULL data; however, the present invention is not limited thereto. The present invention can be applied to diverse delay techniques, including one in which mainstream data is delayed by repeatedly recording the same main data.

In the embodiment described above, the description has been given of the case where the video data compressed by MPEG is recorded; however, the present invention is not limited thereto. The present invention can be extensively applied to cases where video data compressed by various methods is recorded.

As described above, according to the present invention, at least the reproduction reference management information is recorded in the order of pictures of video data to be reproduced and output in a main sector, and in the order of pictures of compressed video data in a subcode sector, thus permitting the entire system to be efficiently configured. Furthermore, search data is recorded on the basis of the time management information of video data in the decoding mode, and display data is recorded on the basis of the time management information of reproduction and output of video data, thus allowing the entire system to be efficiently configured.

INDUSTRIAL APPLICABILITY

The present invention relates to a recording method for a video tape recorder and a magnetic tape, and it is applicable particularly to a video tape recorder for recording HDTV video signals onto a magnetic tape.

REFERENCE NUMERALS

1: VIDEO TAPE RECORDER
2: MAGNETIC TAPE
3: VIDEO DATA COMPRESSOR
3A: VIDEO ENCODER
3B: DTS/PTS GENERATOR
3C: ETN GENERATOR
3D, 28A: VIDEO FIFO
4: SEARCH DATA GENERATOR
5: SOUND DATA COMPRESSOR
5A: AUDIO ENCODER
5B, 30A: AUDIO FIFO
6: AUXILIARY DATA GENERATOR
6A: SUBCODE GENERATING CIRCUIT
6B: VIDEO AUXILIARY DATA GENERATING CIRCUIT
6C: AUDIO AUXILIARY DATA GENERATING CIRCUIT
6D: ECCTB GENERATOR
7: MULTIPLEXING CIRCUIT
7A: NULL GENERATOR
7B: MULTIPLEXER
7C: CONTROLLER
7D: ECC MEMORY
8: CONTROLLER
8A: CENTRAL PROCESSING UNIT
8B: SYSTEM TIME CLOCK STC GENERATOR
8C: REFERENCE ETN GENERATOR
8D: TAPE DRUM SERVO CIRCUIT
8E: DRUM MOTOR
8F: CAPSTAN MOTOR
9: ERROR CODE ID ADDER
9A, 9B: ID, ECC ADDING CIRCUIT
9C: ADDING CIRCUIT
10: SUBCODE GENERATOR
11: 24-25 CONVERTER
12: SYNC ADDING CIRCUIT
13: MODULATOR, P/S CONVERTER
14: MAGNETIC HEAD
21: DIGITAL CONVERTER, S/P CONVERTER
22: DEMODULATOR
23: SYNC DETECTOR
24: ERROR CORRECTION ID DETECTOR
24A: ECC BANK
24B: ERROR CORRECTION
25: 25-24 CONVERTER
26: SUBCODE DETECTOR
26A: SUBCODE ECC
26B: SUBCODE FIFO
27: SEPARATING CIRCUIT

27A: SB DETECTING CIRCUIT
27B: DEMULTIPLEXER
28: VIDEO DATA EXTENDER
28B: VIDEO DECODER
29: SEARCH DATA DETECTOR
29A: SEARCH DECODER
29B: SEARCH AUXILIARY DATA DETECTING CIRCUIT
30: SOUND DATA EXTENDER
30B: AUDIO DECODER
31: AUXILIARY DATA DETECTOR
31A: AUXILIARY DATA FIFO
31B: AUXILIARY DATA GENERATOR FIFO

The invention claimed is:

1. A video tape recorder that sequentially forms recording tracks aslant on a magnetic tape and records video data, audio data, and auxiliary data related to the video data and the audio data onto the magnetic tape, comprising:
    data compressing means for compressing the video data and the audio data to generate compressed video data and compressed audio data;
    pack unit generating means for generating a pack unit by forming compressed video data into a block for each predetermined number of pictures and combining the compressed video data of the block, the compressed audio data corresponding thereto, and the auxiliary data corresponding thereto; and
    a recording system that allocates data of the pack unit to a main sector and allocates the auxiliary data of the pack unit to a subcode sector to sequentially form recording tracks based on the main sector and the subcode sector,
    wherein the auxiliary data of the main sector includes at least reproduction standard management information, which corresponds to time management information of the video data in a decoding mode and which is disposed in the order of pictures of the video data, and the auxiliary data of the subcode sector includes at least the reproduction standard management information and picture type information that are disposed in the order of pictures of the compressed video data, and
    wherein the auxiliary data of the main sector includes, in addition to the reproduction standard management information, time information of the video data and/or the audio data, which is disposed in the order of pictures of the video data, and the auxiliary data of the subcode sector includes time information of the video data and/or the audio data, which is disposed in the order corresponding to the auxiliary data of the main sector.

2. The video tape recorder according to claim 1, comprising:
    search data generating means for generating search data from picture data by encoding within a frame in the video data; and
    auxiliary data generating means for generating auxiliary data for search related to the search data,
    wherein the pack unit generating means further combines the search data and the auxiliary data to generate the pack unit, of the auxiliary data of the search data, search data of the video data recorded on the magnetic tape is recorded on the basis of the time management information of the video data in the decoding mode, and display data to be displayed with an image based on the search data is recorded on the basis of the time management information on reproduction and output of the video data.

3. The video tape recorder according to claim 2,
    wherein the search data is tape position information indicating a position where the corresponding video data has been recorded.

4. The video tape recorder according to claim 2,
    wherein the search data is management information on a reproduction standard of the corresponding video data.

5. The video tape recorder according to claim 2,
    wherein the display data is time information of the corresponding video data.

6. A recording method for sequentially forming recording tracks aslant on a magnetic tape and recording video data, audio data, and auxiliary data related to the video data and the audio data onto the magnetic tape, comprising:
    a data compressing step for compressing the video data and the audio data to generate compressed video data and compressed audio data;
    a pack unit generating step for generating a pack unit by forming compressed video data into a block for each predetermined number of pictures and combining the compressed video data of the block, the compressed audio data corresponding thereto, and the auxiliary data corresponding thereto; and
    a recording step for allocating data of the pack unit to a main sector and allocating the auxiliary data of the pack unit to a subcode sector to sequentially form recording tracks based on the main sector and the subcode sector,
    wherein the auxiliary data of the main sector includes at least reproduction standard management information, which corresponds to time management information of the video data in a decoding mode and which is disposed in the order of pictures of the video data, and the auxiliary data of the subcode sector includes at least the reproduction standard management information and picture type information that are disposed in the order of pictures of the compressed video data, and
    wherein the auxiliary data of the main sector includes, in addition to the reproduction standard management information, time information of the video data and/or the audio data, which is disposed in the order of pictures of the video data, and the auxiliary data of the subcode sector includes time information of the video data and/or the audio data, which is disposed in the order corresponding to the auxiliary data of the main sector.

* * * * *